(12) United States Patent
Frederick et al.

(10) Patent No.: US 7,420,471 B2
(45) Date of Patent: Sep. 2, 2008

(54) SAFETY SYSTEM FOR MINING EQUIPMENT

(75) Inventors: Larry D. Frederick, Huntsville, AL (US); Patricia Nichols, Madison, AL (US); Dwight Medley, Fayetteville, TN (US); Connie Allen, Brownsboro, AL (US)

(73) Assignee: Geosteering Mining Services LLC, Huntsville, AL (US)

( * ) Notice: Subject to any disclaimer, the term of this patent is extended or adjusted under 35 U.S.C. 154(b) by 507 days.

(21) Appl. No.: 11/083,353

(22) Filed: Mar. 18, 2005

(65) Prior Publication Data

US 2006/0087443 A1 Apr. 27, 2006

Related U.S. Application Data

(60) Provisional application No. 60/612,509, filed on Sep. 24, 2004.

(51) Int. Cl.
*G08B 13/14* (2006.01)
(52) U.S. Cl. .................... 340/572.7; 250/239
(58) Field of Classification Search ........... 340/572.7, 340/572.1, 572.8, 321, 539.23, 825.72, 825.76; 250/239
See application file for complete search history.

(56) References Cited

U.S. PATENT DOCUMENTS

| | | | | |
|---|---|---|---|---|
| 4,104,592 A * | 8/1978 | Ratz et al. | .............. | 340/825.72 |
| 4,173,140 A * | 11/1979 | Liebman et al. | ............. | 340/578 |
| 4,314,602 A * | 2/1982 | Frederick et al. | .............. | 165/10 |
| 4,894,497 A * | 1/1990 | Lycan | ......................... | 340/544 |
| 5,742,057 A * | 4/1998 | Frederick et al. | ............ | 250/368 |
| 5,796,109 A * | 8/1998 | Frederick et al. | ............ | 250/368 |
| 5,939,986 A | 8/1999 | Schiffbauer et al. | | |
| 5,962,855 A * | 10/1999 | Frederick et al. | ......... | 250/361 R |
| 6,355,932 B1 * | 3/2002 | Frederick | .................... | 250/368 |
| 6,435,619 B1 | 8/2002 | Frederick et al. | | |
| 6,452,163 B1 * | 9/2002 | Frederick et al. | ............ | 250/239 |
| 6,465,788 B1 * | 10/2002 | Medley | ...................... | 250/368 |
| 6,469,619 B1 * | 10/2002 | Maycheck et al. | ......... | 340/331 |
| 6,657,199 B2 * | 12/2003 | Frederick et al. | ............ | 250/361 R |
| 6,734,796 B2 * | 5/2004 | Forster et al. | ............ | 340/572.3 |
| 6,781,130 B2 | 8/2004 | Frederick et al. | | |
| 6,810,353 B2 | 10/2004 | Schiffbauer | | |
| 6,894,610 B2 * | 5/2005 | Schubert et al. | ............. | 340/531 |
| 7,005,576 B2 * | 2/2006 | Niederriter et al. | ............ | 174/50 |
| 7,034,305 B2 * | 4/2006 | Frederick et al. | ........ | 250/361 R |

* cited by examiner

*Primary Examiner*—John A Tweel, Jr.
(74) *Attorney, Agent, or Firm*—Dickstein Shapiro LLP

(57) ABSTRACT

A safety system for mining equipment is provided having a proximity-based system with a marker field generator in an explosion-proof housing. The generator has a resonant circuit with an inductive reactance that is provided by a ferrite rod wound with an electrical conductor. Also provided is an RF receiver to receive information about the strength of the generated marker field from a sensing device used by a worker. The system provides for a personal alert device, carried by personnel to be kept at a safe distance from the mining machine, the personal alert device being capable of detecting the marker field. Also disclosed is a geosteering system that stops the cutting of a continuous miner when the cutter reaches an interface between a mineral being mined and an adjacent formation that is not to be mined.

78 Claims, 13 Drawing Sheets

SAFETY SYSTEM FOR MINING EQUIPMENT

This application claims the benefit of U.S. Provisional Application No. 60/612,509, filed on Sep. 24, 2004, the entirety of which is incorporated by reference herein.

BACKGROUND

Operation of Continuous Miners (CM) is one of the most dangerous jobs in the coal mining industry. Fatalities and injuries to mining personnel working in the vicinity of CMs are a major concern to both the industry and to the government health and safety organizations, Mine Safety and Health Administration (MSHA), and the National Institute of Safety and Health (NIOSH). MSHA and NIOSH have initiatives and programs under way to try to improve the health and safety of personnel working around CMs. Further improvements are not likely to be made by better procedures and controls alone, better technical tools being needed. The operational conditions for CMs are especially complex and challenging and produce unique hazardous conditions. Some technical solutions to these difficult safety and health hazards around CMs are applicable to other work environments involving mobile equipment.

The hazards and health concerns for CM operators and other workers are many and need to be explained in order to understand the associated problems and solutions. They can be generally divided into three categories. One category are the health and safety concerns associated with the cutting process. Another category is associated with moving the CM from one position to another, called tramming, which is necessary and frequent, and movements of the cutter boom and loading boom. The third category is performing maintenance or other operations on the CM. For purposes of this specification, the third category can be grouped with the hazards associated with category two. One factor in common with all these hazards is the proximity of personnel to the CM and/or to the geologic formation in which the CM is operating.

During cutting, operators typically position themselves as far forward toward the mineral face as safety rules will allow so that they can better see, hear, and feel the vibrations from the cutting process. The most challenging phase of their cutting control task is when the cutter drum is shearing down toward the floor because the view of the front area of the miner is obstructed by the miner itself and by dust and water sprays. When cutting around a corner during a crosscut, the view is further obstructed by a pillar. After frequently being in a forward position, at the side of the CM, it becomes a comfort zone and the operator develops a habit of remaining in that position, even when tramming.

In recent times fatalities and serious injuries have resulted from metallic objects being thrown from the cutter, hitting personnel. Rocks or coal sometimes fall from a freshly cut wall or roof, seriously injuring or resulting in fatalities, even when the operators are behind two roof bolts, which is required by safety rules. Positions further from the coal face are less hazardous. The NIOSH, a division of the Center for Disease Control, studies and reports on the serious health hazards from CM produced dust and noise. It is rather obvious that the safety and health of the operators would be improved if they were positioned further from the CM and the coal face being cut. Not only is there a need for a method of keeping personnel further away from the hazards, there is also a need to help the operator to develop safer habits.

It has already been made possible to re-position the operator further from the CM and the mineral face, during cutting, through the use of Armored Rock Detectors and Geosteering techniques as described in U.S. Pat. Nos. 6,781,130 and 6,435,619, which are incorporated herein in their entireties. However, even if this capability, now available to the industry, were being widely used, experience has shown that operators may continue to move unnecessarily close to the CM and to the mineral face. A proximity system is needed for use in conjunction with Geosteering to provide protection to miners during all CM activities.

Because of the significant number of fatalities resulting from crushing by CMs, the MSHA has made the development of an effective proximity system their highest priority safety initiative. Historically, the greatest concern has been for the CM operator since he is constrained to be in the vicinity of the CM at all times. However, personnel other than the operator are sometimes crushed by the CM, and their safety should be protected equally well. A major reason for other personnel being dangerously close to the CM is in order to help move the power cable trailing behind the CMs through which they obtain their electrical power. The CM is used to drag the heavy cables as it is moved from one cut to another, which is typically required many times during a work shift. As workers attach cable straps to the CM, they must essentially touch the CM. Although the CM should be stopped until after the worker has completed his task, mistakes are made. Whether due to operator error or equipment failure or a combination of these factors, these workers are sometimes crushed before they leave the hazardous area. Since the length of CM crawler tracks are short relative to the length of the overall CM, each end of the CM can move quickly, giving little time for a worker to move away. Also, personnel may approach the CM in order to make an adjustment or for maintenance purposes. The two booms of the CM may be moved or be articulated such that a worker is crushed against the wall or roof. Incidents like these, and others, could not occur if CM movements were stopped when the CM is dangerously close to any worker. Therefore, there needs to be an automatic method of stopping the CM movements if the CM is too close to a worker. A worker should be able to make a Panic Call to stop the CM if a hazardous condition is being created for himself or others.

Though the safety challenges for the CM are generally more operationally complex than for mobile machines used in most other industries, overcoming these challenges has produced technology that can improve the safety of other mobile equipment, including trucks, tractors, fork lifts, rollers, etc. Even within the underground mining operations, there is a need for an effective proximity system for use on shuttle cars, pinning machines, rides, and other moving equipment. There is also a need for an effective method of preventing personnel from entering un-supported roof areas, conveyors, and such which can benefit from this same technology.

It should be pointed out that many types of proximity devices and systems have been used through the years. None are very effective for underground mining applications and have been only moderately successful in some other industries. In many cases, these devices and systems have been passive types that have not included an active element worn by the person being protected. Nuisance alarms are a common problem which reduces the effectiveness of some systems.

Important progress was made with the proximity concepts offered by the Schiffbauer U.S. Pat. Nos. 5,939,986 and 6,810,353, which are incorporated herein in their entireties. However, there are significant deficiencies in these concepts. Important issues and technical problems must be resolved before they can be made effective for underground mining applications. Novel solutions are required. For example, in order to provide a magnetic marker field around all or most all of a CM, multiple generators are required. According to the '986 patent, multiple loop antennas may be driven with a single alternating current source. Not addressed are requirements for positioning, orienting, and phasing of the loops to produce fields that are complimentary and not mutually destructive. Loops are difficult to protect in the harsh environment on a CM. They must be placed in a plane that is generally parallel to the outer surface of the CM to avoid damage. If oriented perpendicular to the CM, they will soon be ripped off. Any item attached to the outer surface of a CM must be specially designed and protected. Most locations on a CM are such that a loop in any orientation will require carefully designed protection. Structural elements used to protect the loops alter the shape of the fields, though not as much for low frequencies as for higher frequencies. The fields produced by adjacent loops will vary according to the separation of the loops and the distance from the loops. Taking all these variables in combination, one can readily conclude that the use of multiple loops to produce a single, uniform marker field is not easy to accomplish. Adjustment of fields generated by loops can be difficult and time consuming, at best. An earlier approach was to use a single loop around the entire CM body. Protection of such a loop is difficult to achieve and once installed such a loop reduces access to CM equipment. Providing sufficient driving power, combined with the difficulty in tuning the coil to resonance, creates a very challenging situation. Another general concern with loops that are to be close to the coal face, carrying large circulating currents and resonance-produced voltages is that they are being used in an atmosphere that may, from time to time, be explosive. It is desirable for such devices to be contained within explosion proof (X/P) housings. Placing such loops inside an X/P housing is not feasible due to size and other factors.

In the Schiffbauer '353 patent mention is made of the possible use of a ferrite as the inductor for producing the magnetic marker field, rather than a loop, though no details are supplied. Practical and crucial considerations of how to design the ferrite "antennas" so that they can be effectively protected, properly positioned, properly oriented, and how to control the phasing of multiple ferrite "antennas" are not addressed. As explained above, the profile of the "antennas" must be made as low as possible while, at the same time, providing shielding from the mining materials and the walls. They must be properly spaced so that they must be made capable of withstanding the environment at the installed location. Also, if separate signals are provided for each ferrite, as implied by the '353 patent, there will be a phasing problem. Since all of the set of "antennas" must operate within a relatively small bandpass produced by the required resonant circuits, some of the units are likely to be operating at frequencies that are nearly the same. The beat frequencies in the magnetic field will produce fluctuations in the field strength readings by the alarm devices carried by the workers, which is the basis for determining when a worker is within a hazardous zone. One could attempt to provide a minimum separation between the frequencies of all marker field generator units. But, there are obvious practical problems with providing sufficient frequency separation between units, particularly when there is a limited bandwidth. A method of avoiding beat frequencies in the marker field is needed.

In the Schiffbauer '353 patent, a device, called a "receiver" was described that had ferrites wound with copper coils that were used to sense a marker field, circuits to measure its strength, circuits to make a decision if the "receiver" was in a Warning Zone or in a Stop Zone. It also contemplated the need to send warning or stop decisions to the mobile equipment to be acted upon. But, there are important problems to be solved before this concept can become a practical system for use on a continuous miner. For example, critical timing problems posed by simultaneously operated multiple "receivers" must be solved to prevent the signals from the "receivers" from interfering with each other when they transmit data or commands to the CM. After more study into the safety problem being solved, it is apparent that additional capability is needed. For example, the worker needs to be able to give commands to the CM to identify the operator in charge, to reset the system after the CM has been stopped by the system, and other commands, all without having to enter the warning or stop zone around the CM in order to reach the controls on the CM. There is a need to provide an identification (I.D.) for each "receiver" and to record data for each "receiver" in range. The worker needs to be given a sense of urgency by his alarm if a CM is approaching. The operator needs to know if there is a miner in range who has a low battery voltage in his personal alarm, and each such safety event should be recorded. The strength of the marker field being measured by the "receiver" needs to be transmitted to the CM for recording for use in investigations of incidents. Most, if not all of these needs have to be met in satisfactory manner so that the total system is user friendly and effective.

There is also a need for an integrated system concept not addressed by the prior art, and a need for other capabilities not considered. Many operational rules and procedures have been employed to improve miner safety. Countless safety features have been designed into modern mining equipment. However, even with these many innovations, communications between mining machines and between personnel moving from place to place in the mine continue to have serious shortcomings. An example is when the operation of one CM should result in constraining the operation of another. This can exist whenever two CMs are operating within the same mining unit, sometimes referred to as a super unit. Ventilation requirements often specify that two CMs in the same unit not be cutting coal simultaneously. Verbal coordination is not sufficiently dependable and currently available techniques for interlocking the CMs are complex, costly, and troublesome. A better system is needed.

Much progress has been made by the American mining industry in eliminating underground explosions and fires and other disastrous situations, but they sometimes occur. Frequently, immediately after such events, location of the workers is very difficult and sometimes impossible because the workers move around as they work, and their equipment is moving as well. Even though numerous communication devices have been employed, using many different technologies and approaches, communications problems remain. In particular, there is a need to provide better reporting of the location of personnel within the mine and to do so in a way that is transparent to the worker so as to not impact his activities or to be distracting. Finally, it is desirable that all safety improvements be implemented in such a way that reduces stress on the worker.

Finally, one of the reasons that some potentially useful communication devices are not employed is due to the difficulty of keeping the devices properly positioned in the mine and of keeping them operational under such difficult circumstances. In some locations, power is not available so that portable generators having an internal battery supply are needed. Also, proliferation of safety and communications devices can cause confusion and complexity which detracts somewhat from safety. These safety innovations need to be combined in a more effective manner than has not been achieved in the past.

SUMMARY

The current invention is a safety enhancement system for use on mining equipment and other mobile machinery. This system, including a proximity system, solves problems that are specifically important to workers around Continuous Miners but are applicable to other equipment as well. The inventors cannot guarantee miner safety through the use of this system, only that it will assist the workers to follow safety practices and procedures, provided by their employer, for which they have been trained to follow.

There are two major categories of hazards associated with CM activities and a proximity system is applicable to both. One category exists when the CM is cutting mineral and the other category exists when the CM is tramming or being operated in ways other than cutting mineral, such as during maintenance or adjustment. An embodiment of a system that improves safety for the hazards associated with tramming or movement of the CM is called TramGuard™. An embodiment of this system, used in combination with Geosteering, in order to provide protection for both CM safety categories, is called GeoGuard. Since GeoGuard is essentially the integration of TramGuard™ with Geosteering, the specification can be shortened with no loss of understanding by directing most discussion to TramGuard™.

MSHA has as its goal to keep personnel out of the turning radius of the CM when it is not cutting mineral. Proximity protection is at the heart of the solution. The proximity system concept is portrayed in FIGS. 1, 2. Essential elements in the proximity protection system are marker fields around the CM and personal alarm devices which detect and respond to the field. Marker Field Generators 1 are the devices used to produce the marker field and Personal Alarm Devices 53 are the devices used to detect the field and to initiate action to alarm the worker and to stop the CM 8. The alarm devices produce an audible alarm to warn the miner and send important data and commands to the CM. The Master Marker Field Generator 7 includes an RF receiver 58 to accept the data and commands and to route them to the Display 4. The Display 4 includes a Logic Module 5 that processes the data and makes decisions to display information to be seen by the workers, particularly the CM operator, and to take steps to protect the workers if needed. Signals from the CM 8 and commands to the CM 8 are routed through the TG/CM Interface Module 9.

The Display 4 is mounted on the CM 8 such that it is easily viewed from the rear of the CM 8, at a distance of at least 10 feet from the CM 8. An operator is depicted in FIG. 1 controlling a CM 8 by use of a remote control unit 93. He also carries a PAD 53 in his shirt pocket or in his vest such that the three switches are exposed on the top side of the PAD 53. The switches 51, 52, 54 can be seen in FIG. 7. His PAD 53 transmits information to the portion of the rest of the TramGuard™ system that is located on the CM 8.

The electrical cables 201, 202, 203, 204, 205, 206, 207 and 208 in FIG. 11 show how the Magnetic Field Generators 1, 7, Display 4, Interface Module 9, and CM 8 are connected together. Also shown is a depiction of the magnetic field 10 around the CM 8 that is produced by the five Field Generators operating simultaneously. The strength of the oscillating magnetic field around the CM will be similar for each CM installation. The magnetic field lines 10, 11 indicate the positions in field that define the Warning Zone and the Stop Zone.

The next few paragraphs discuss the system aspects of three key elements; namely, the Marker Field Generator FG, Master Marker Field Generator MFG, and Personal Alert Device (PAD).

Schiffbauer patents '986 and '353 present a proximity system concept that places a marker field on mobile equipment. The marker field generator concept presented by those patents cannot be effectively and safely implemented on a CM without first solving some critical technical issues. A generator used in underground mining where there is gas or dust that can be ignited by electrical devices, must be made Intrinsically Safe (I.S.) or must be housed inside an Explosion-Proof (X/P) housing. Since a significant current of at least a few amperes, and tens or hundreds of volts in the resonant tank circuit is required to generate a marker field having a magnitude significantly higher than ambient noise from equipment, making a generator to be I.S. is very difficult. Use of an X/P housing is preferred, if not necessary. But, significant problems arise when trying to generate magnetic fields within a typical X/P housing. Solutions are provided by the preferred embodiments of the current invention.

FIG. 2 shows a typical top view of a CM 8 that has been outfitted with a TramGuard™ system having Marker Field Generators positioned at five locations 1, 7. Field Generators (FGs) at these five locations will produce a field around the CM except for some areas in front of the cutter 94. The strength of the field will be such that a Warning Zone, represented by magnetic field line 10, can be set at approximately 9 feet from the CM and a Stop Zone, represented by magnetic field line 11, can be set at approximately 6 feet. At the rear of the CM, these numbers will be slightly lower. These distances may be adjusted depending upon the CM configuration, its speed, and operational considerations. Fewer than five generators may be used if special circumstances allow limiting the protection to only a segment of the area within the CM turning radius. For example, three generators on the rear will protect the rear of the CM or three generators on the operator side will protect that side of the CM.

A predictable magnetic marker field can best be produced with frequencies below 100 kHz. One reason is that oscillating low frequency magnetic fields, which have long wavelengths, do not readily propagate. Even when antennas that are hundreds of feet in length or height are used, their lengths are small compared to the 3,000 meter wavelength of a 100 kHz oscillation. It is well known by people working in low frequency communications that even large antennas are inefficient radiators. When oscillating fields are produced by elements that are only inches or a few feet in size, the radiation at frequencies below 100 kHz is negligible. Another reason is that low frequency fields are not readily reflected from surfaces or objects in the field. A frequency that has been successfully demonstrated to produce a uniform field is 73 kHz. Lower frequencies can be used but the size of the reactive elements must be increased to retain the same overall efficiency. More information about general characteristics of low frequency electromagnetic fields is available from published literature.

The term "antenna" sometimes used to describe the source of a low frequency magnetic field is somewhat of a misnomer. Since a 73 kHz wave has a length of over 4,000 meters, the size of the source compared to the wavelength is so small that the efficiency of producing emissions is extremely small. The field that is produced simply builds up around the inductor and then collapses and reverses direction. The strength of the field decreases according to the cube of the distance from the source, rather than according to the square of the distance for an emitted wave. Long wavelengths being generated by a relatively tiny source do not radiate and have very limited usable distance unless a huge amount of current is driven through the inductor. For purposes of this specification the term "generator" will be used for the assemblies that produce the marker field instead of the term "antenna."

There are two arrangements for amplifying the single oscillating signal to the generators. One option is to perform the amplification in a central unit, such as in the Display 4, and the other option is to perform the amplification within each generator. An advantage of the centralized approach is that only one amplifier and one power supply for the amplifier is needed, thus reducing the amount of hardware items required. One might even consider placing the capacitors required for the tuned circuits in the same centralized location. However, the preferred configuration is to place an amplifier in each marker field generator to amplify the oscillating signal that is common to all generators, as shown in FIG. 3. One reason is that the stray capacitance in the cables will become part of the tuned circuit, requiring that each generator be tuned after installation. Also, if the capacitors are separated from the inductor by a long cable, the resistance of the cable will reduce the quality "Q" of the resonant circuit which will reduce the magnitude of the circulating current which will reduce the size of the marker field. The driving current would have to be increased to compensate for this loss of efficiency. Finally, if multiple generators are driven by a single amplifier there will be coupling between the generators which will complicate setup and calibration.

An electrical conductor 23 wound around a ferrite rod 55, as depicted in FIG. 3, properly sized in series with capacitors, to be a "resonant tank circuit," is an effective means for generating a magnetic marker field. Power supply voltages below 5 volts can be used to produce adequately high currents by arranging the tank circuit to be series tuned, though higher voltages may be used. The generator will be more effective if it is positioned so that it has an open field of view to the region around the CM which is not substantially blocked by the CM metallic structure. If the generator is to be placed inside an X/P housing, the housing must be very durable in order to withstand the impact from mined materials and other forces, or to be otherwise protected. It is desirable to make the housing from a structurally strong material, such as metal. In order for the housing to be X/P it must have certain other special features. For example, the cable through which power and signals are sent to the generator must be sealed where it enters the housing, using an approved gland. Approved gland assemblies are usually designed to provide metal against which the gland is compressed. Usually, a gland assembly is part of the housing to stay within space limitations, reduce cost, and for simplicity. Tuning capacitors that complete the tuned tank circuit need to be contained within a shielded housing to minimize the effects of stray capacitance. If the circuitry is not shielded, the tuning will be affected somewhat by the iron in the machines onto which it is attached.

A CM sprays water to prevent dust clouds, which can be explosive thus producing a requirement that the housing must be water tight. There is usually a need for a heat sink to conduct heat away from the electrical components, so that the housing should be made from a good heat conductor such as metal. It might thus seem obvious for all these reasons that it is desirable to protect the generator inside a metal X/P housing. However, if a magnetic field generator is placed inside a metallic housing, such that there is metal circumferentially surrounding the inductor, it will be difficult to tune the circuit and the marker field will be attenuated.

To solve this apparently conflicting set of needs for a housing that best be metallic for one set of reasons but would best be non-metallic due to another important reason, an embodiment of this current invention is to construct an X/P housing that is partially metallic and partially non-metallic. This is illustrated in FIG. 3 which will be described in more detail later.

Yet, once such a generator is available, there remains the problem of protecting the generator X/P housing, especially the non-metallic portion of the generator X/P housing from impacts and forces encountered during the mining and tramming activities. Providing protective structure around the X/P housing so that it can safely withstand the harsh environment re-introduces some of the challenges found in constructing a suitable X/P housing. If a shield is made with metal which fully surrounds the inductor such that there is a continuous metallic path around the circumference of the inductor, performance will be degraded. Trying to overcome this degradation by increasing the current through the ferrite winding creates other technical problems. One aspect of this invention is to protect the generator by a metallic channel in which the channel is closed out by a non-metallic panel. It has been shown that such a configuration, shown in FIGS. 3, 4, 5 will not significantly degrade the performance of the generator, even though three sides of the generator are enclosed by metal. It provides a high degree of protection for the generator and has a low profile. An alternate method for protecting the generator is shown in FIG. 6, where an open-type metallic guard has been placed over the generator. However, such a configuration can only be effectively used if the metallic material around the generator is broken in the circumferential direction by a non-metallic separator. The preferred configuration is shown in FIG. 4. This has the minimum profile, is a made into a single piece for convenience, and has metal panels in the side to protect against crushing.

Certain activities of the CM operation are important to a complete and effective proximity system, such as an indication if the cutter 94 is on, if the conveyor 95 is running or if the CM 8 is being trammed. These and other relevant indications are available inside the X/P control panels 96 (FIG. 11) that house the CM controls. To acquire these indications for use by the TramGuard system, an Interface Module 9, shown in FIG. 11 is installed inside the control panel 96. Needed indications are routed through the Interface Module to the Display 4 where they are acted upon by the Logic Module 5. Decisions are made in the Logic Module to place the TramGuard™ into an active mode or to put it into a monitor mode. If the cutter and the conveyor are not operating, the TramGuard™ is put into a fully active mode in which the Display 4 will announce warnings if any worker is within the Warning Zone 10 and will stop the CM tram motors and the hydraulics for both booms 14, 15. Stopping the CM 8 is accomplished by the Logic Module 5 sending commands to the Interface Module 9 to open relay contacts. These relays and their contacts can be seen in FIG. 11. If either the cutter or conveyor is running, the TramGuard™ system will be in a monitor mode and will continue to record information from the PADs 53. Exact details as to the kind of signals that must be acquired by the Interface Module 9 from the CM 8 controls and the kind and quantity of circuits that must be acted upon varies between machine types. The signals and controls indicated in FIG. 11 are indicative of a typical CM configuration. A section in the Interface Module 9 labeled Signal Conditioner (FIG. 11) will have to be varied according to signals available.

An effective frequency range for communicating within a mine is to use medium frequencies between 100 kHz, and 500 kHz. It is well documented that radios operating in the low to medium frequency ranges have been used successfully for underground rescue and cave exploration because the signals penetrate the geologic formations, to some degree, thus reaching the intended receivers not in the line of sight. More importantly, medium frequencies are also known to be propagated by parasitic retransmission from metal objects located between the transmitter and the receiver. There are power cables and pipes in mining operations that serve to assist in propagation. Specifically, there are power cables that run between the CM and the power source so that there is a common power feed between two CMs operating synchronously within a mining unit.

An aspect of the currently described system is to provide the capability of transmitting safety data and other information from the CM to a remotely located monitor or recorder. Medium frequency does not require line-of-sight in the mining environment so that the monitor/communications antenna or sensing cable does not have to be continually re-positioned to be able to receive transmissions as is typical for UHF systems typically used today. With a TramGuard™ system in use, it is practical to make use of the field generators to transmit information at medium frequencies. A novel and important aspect of this invention is that the field generator is used to generate oscillating magnetic marker fields at frequencies in the range of 73 kHz, which do not propagate, and also to radiate signals at medium frequencies in the range of 345 kHz. Providing dual frequency capability from the same ferrite is accomplished by properly sizing the components, using two sets of capacitors that can be electronically switched into or out of the resonant circuit, and by providing a tap on the winding of the ferrite. This works very well since the medium frequency transmission is needed while the CM is cutting, in order to lock out another CM in the same unit, and the low frequency marker field is needed when the CM is not cutting to provide proximity protection. Although CMs in a super-section, i.e., where a plurality of CMs, typically two, are working together in a coordinated manner, typically are much closer to each other than to other CMs in the mine, they have I.D. codes in each transmission, using a simple PCM format, so that they will not be affected by stray signals from other CMs.

Once field generators have been designed according to the explanations in this specification, they have many other uses. The medium frequency transmissions may be made to contain important safety information. The transmission may report that miners have entered the Warning Zone or the Stop Zone, that CMs have been disabled by the TramGuard™ system, statistics on the frequency of warnings, the I.D. of personnel in the vicinity of the CM, etc. By combining the special advantages of communicating with medium frequencies and the advantages of a conventional hard-wire system, a more effective system can be provided. Safety related information can be recorded by an external monitor or be sent to above ground for monitoring by safety management or other personnel.

A mine that has outfitted its CMs with TramGuard™ systems will also have outfitted most of its underground crew with Personal Alarm Devices. Switches on each PAD allow the wearer to make a Panic Call for help. If near a CM that has been equipped with a TramGuard™ system, the CM will be disabled and their emergency call can be transmitted to the overall mine communication system through the medium frequency RF link and sent above ground to alert safety engineers.

Although mine disasters in this country have been greatly reduced over the years, they still occur. In some other countries, mine disasters are more frequent. An important step in rescue and recovery operations is to determine where the workers are located within the mine. As part of their job they are continually moving from place to place. Many procedures and protocols, as well as technical approaches, have been used to track personnel. There remains a need to do much better. By placing a few marker field generators at strategic locations along underground roads, each worker can be identified as he passes. Also, his PAD will beep when he passes a generator, reminding him that he is being tracked so that his location will be better known in case of an emergency. Most mine communications systems have ports into which information can be transmitted and sent to above ground for recording and/or monitoring. By tying these generators on the system, each person passing each generator will be recorded. Since most of the workers in room and pillar coal mining spend much of their time in the vicinity of a CM, their presence in the vicinity of the CMs can also be added into the communications system. Even their approximate distance from the CMs will be known at the moment in time when an emergency occurs.

Some locations within a mining operation are considered to be unsafe zones for some or all personnel. These zones can be marked by use of a field generator so that any worker, outfitted with a Personal Alarm Device, will be warned if approaching such a zone. Examples are areas where there is an unsupported roof. Roofs are supported by bolts 250, shown in FIG. 2. Locations around certain equipment such as conveyors should be limited access. Not only can a field generator be used to warn personnel that they are entering such a zone, but the fact that they have entered a hazardous zone or have come within the range of the ultra high frequency (UHF) radio frequency (RF) receiver 58 in the generator 7 can be recorded and/or transmitted to an external monitoring station. In some instances, power is not readily available for connecting to a field generator. One embodiment of the current invention is a portable marker field generator that is battery operated. In order to extend battery life, the micro-controller 61 would power down all components except its own power. On a pre-programmed schedule, the micro-controller 61 (FIG. 12) would turn on the RF receiver 58 and listen for the signal from a PAD. If none is heard within a time window, a the 0.25 second transmit window for example, it would once again power down. Only after the RF receiver 58 detects the presence of a PAD is the magnetic field generator 7 energized. This device may thus provide a protection for many weeks or months, before requiring recharging.

Addition of a microphone 254 and exchanging the micro-controller 61 with a DSP-type micro-controller would allow each miner carrying a PAD to communicate with other PAD-carrying personnel, through the CM TramGuard™ system. This would help workers to coordinate their activities around the CM without having an additional radio. By using DSP technology, communications can be configured to go point to point and also to go through a central monitor 252, which can be placed anywhere in the mine. Using the much higher power medium frequency radiated from the Field Generators allows the RF signal to reach the central mine communications system. This addition to the portable version of the field generator will allow a worker to carry his PAD capability into a wide range of situations. This configuration could be used by other workers in hazardous situations such as firefighters and others who have to enter enclosed structures where VHF and UHF communications are prevented by the metallic elements within the structures.

These and other features and advantages of the invention will be more clearly understood from the following detailed description and drawings of preferred embodiments of the present invention.

DETAILED DESCRIPTION OF PREFERRED EMBODIMENTS

Figure 1:
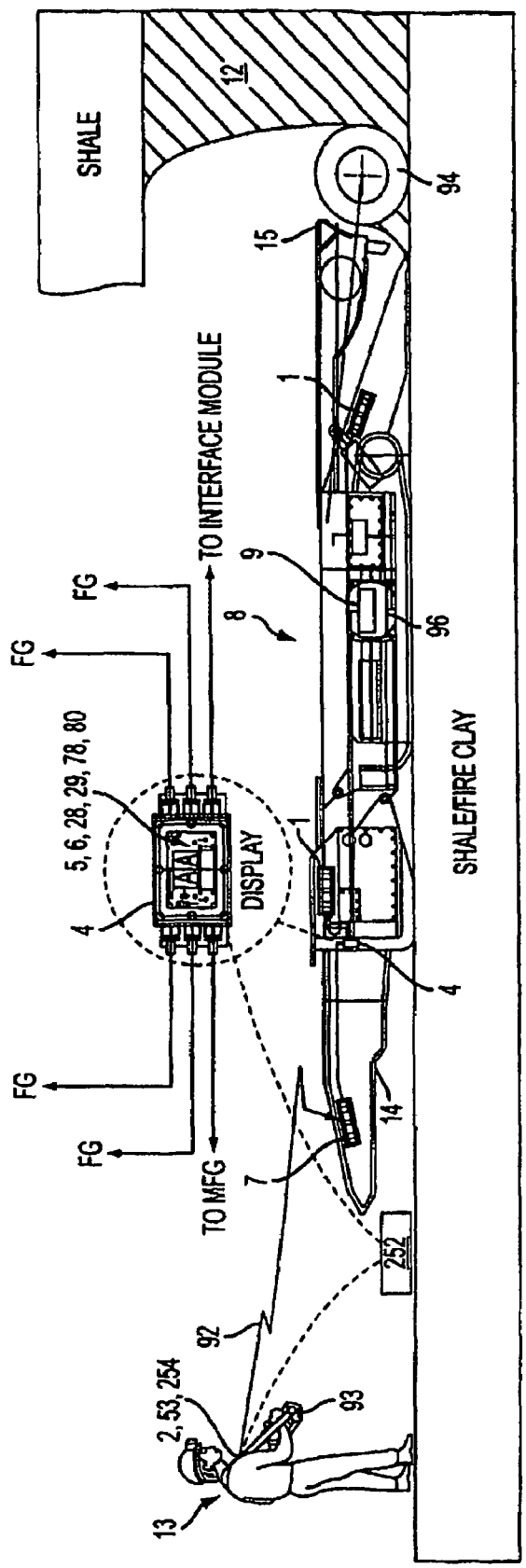
FIG. 1 is a diagram that shows the side view of a CM that has been outfitted with a TramGuard™ system.

Embodiments of the current invention, some aspects of which are based on the principle of proximity detection, show the many features that make a complete, effective safety system. With reference to FIG. 1, included is a Marker Field Generator (MFG) 1, having the dual capability of generating a low frequency magnetic marker field and a medium frequency transmission capability for communicating between CMs and external ports. A method of making such generators safe for use in a hazardous environment is provided. Personal Alarm Devices 53 are necessary links in the system, providing a range of capabilities which, when taken collectively with the rest of the TramGuard™ system, provide other important communications elements for a complete system. These and other aspects of the invention will become clear as the drawings are explained in more detail.

Before attempting to describe details of the drawings, some explanation is needed to establish a framework for the overall system in order for the system to be effective and practical to use. The operations around a CM are complex, involving a team of workers that operate tram cars, bolting machines, and that perform other necessary functions. In addition to CMs tramming into workers, injuries and fatalities have also occurred due to being pinned by the movement of the coal loading boom 14 and the cutter boom 15. This has occurred by side to side movements of the coal loading boom 14 and by up and down movements of both booms 14, 15. Reports from safety investigations following fatalities indicate a variety of situations and multiple factors that have contributed to crushing incidents. In all cases, it is rather obvious that if the workers had not been close to the CM, they would have survived. In a few cases, workers were performing tasks that required them to be near the CMs but in many cases, the reports conclude that they could have been at a safer distance if they had so chosen.

Safety rules do not allow operators to work under an unsupported roof so that they are required to stop at a point where there are at least two rows of bolts in the roof in front of the operator. Even when the operators fully obey that rule, they are still inside the "Red Zone" that safety rules have defined as hazardous areas. Although health and safety hazards at such close distances to the mineral face being cut are real and important, new technologies such as Geosteering have not yet been incorporated to a significant degree in the industry so that it is currently considered necessary for CM operators to be positioned near the CM during the cutting process. To accommodate this operational reality, TramGuard™ removes the marker field when the cutter motor or the conveyor is turned on. A time delay, which can be adjusted in length, is then provided which allows time for the worker to egress from the warning zone to avoid a nuisance alarm or an unintended shutdown of the CM. Given these considerations, and numerous other variables, it is obvious that many factors must be considered in designing a system such as TramGuard™ and that it must possess multiple capabilities that are compatible during use.

Figure 2:
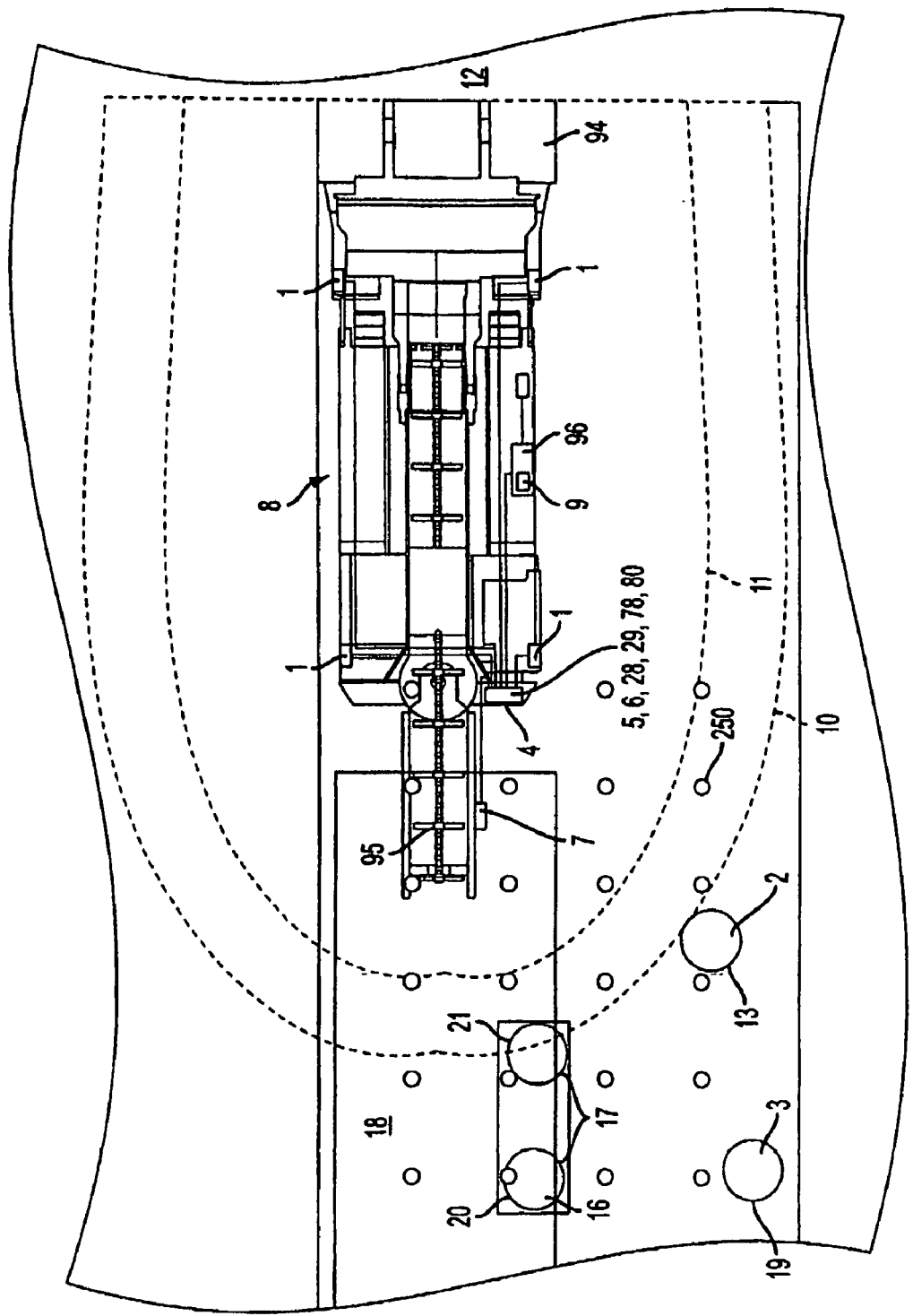
FIG. 2 is a top view of a CM that has been outfitted with a TramGuard™ system, depicting a marker field.

Refer now to FIG. 1 and FIG. 2 for a depiction of a CM 8 that has been outfitted with a TramGuard™ system and some personnel 13, 16, 19 working around the CM 8. Depicted in FIG. 1, is a side view of a typical CM 8 which has been outfitted with a TramGuard™ system. In this view, the CM 8 is cutting coal 12 and the operator 13 is indicated to be at a relatively safe position behind the CM 8, controlling the CM 8 with a typical CM remote control 93. Some of the crushing hazards occur when the CM 8 is being moved, called tramming. Many situations can arise during tramming that places workers in danger. As an example, if the operator 13 in FIG. 1 remains in his position and trains the CM 8 backward past himself, he will be dangerously close when it passes. A typical tunnel being cut is approximately 20 feet wide and a typical CM will be approximately 11 feet wide, having a cutter drum 94 that is approximately 12 feet wide. These dimensions vary somewhat from case to case. In this example, if the CM 8 would be about 2-3 feet from the opposite wall, and that would only leave 6-7 feet clearance for the side where the operator 13 is positioned. Since a typical CM may be 40 feet long and its trains may be only 10 feet long, a command to turn the CM can result in the ends of the booms moving quickly in the direction of the operator 13. At times, workers other than the operator may also be passed by the CM 8, thus placing those other workers in jeopardy as well.

Three workers 13, 17, 19 carrying PADs 2, 3, 16 are depicted in FIG. 2. Two magnetic marker lines 10, 11 have been drawn to indicate a the beginning of a Warning Zone at line 10 and the beginning of a Stop Zone at line 11. An objective of TramGuard™ is to warn workers if they enter the Warning Zone 11 and another objective is to disable movement of the CM 8 if one of the workers 13,15,16 within the Stop Zone 11. Audible warnings are produced by the PAD carried in the miners' shirt pockets or vest pockets. A yellow "W" is displayed on the TramGuard™ Display 4 if any miner 13, 17, 19 is in the warning zone 10 and a flashing red "SZ" is shown when the separation between a miner and the CM 8 is such that the miner is within the Stop Zone 11. In order to avoid the situation in which the CM 8 is disabled and then again re-enabled when the miner and/or his PAD is moved out of the Stop Zone 11, TramGuard™ will allow the CM 8 to be made moveable again only after specific steps are taken, as will be explained later in the section describing the PADs.

In FIG. 2, a shuttle car 18 is shown in the loading position where it would be if coal was being off-loaded from the CM 8. Notice that there are two positions for the shuttle car operator 17. When driving toward the CM 8, the operator 17 is in the position 20 further from the CM 8 than when he is in position 21 to drive away. This is an example of the operational complexity that must be considered in the TramGuard™ control logic. Any time the conveyor is operating, the marker field, depicted by lines 10,11 is turned off. When the shuttle car 18 is loaded, and the conveyor is turned off, the MFGs will automatically be turned on, after a 5 second delay, for example, to allow time for the shuttle car operator 17 to drive the shuttle car 18 away far enough to take him out of the warning zone, depicted by the outer field line 10.

It is apparent from the diagrams in FIGS. 1 and 2 that the provision for generating the marker field, which is used to determine proximity of the CM to the workers, is a key element. Another key element is the means to detect the marker field which is accomplished by PADs 53. These two key elements will be described next before to returning to discussion about the total system.

The Background discussion explained some of the reasons that the marker field generators described in the next few drawings are preferred to those concepts that are mentioned in the Schiffbauer '986 and '353 patents. That background information is important to fully understanding the merits of this invention but it will not be repeated here in order to reduce the length of the specification.

Figure 3:
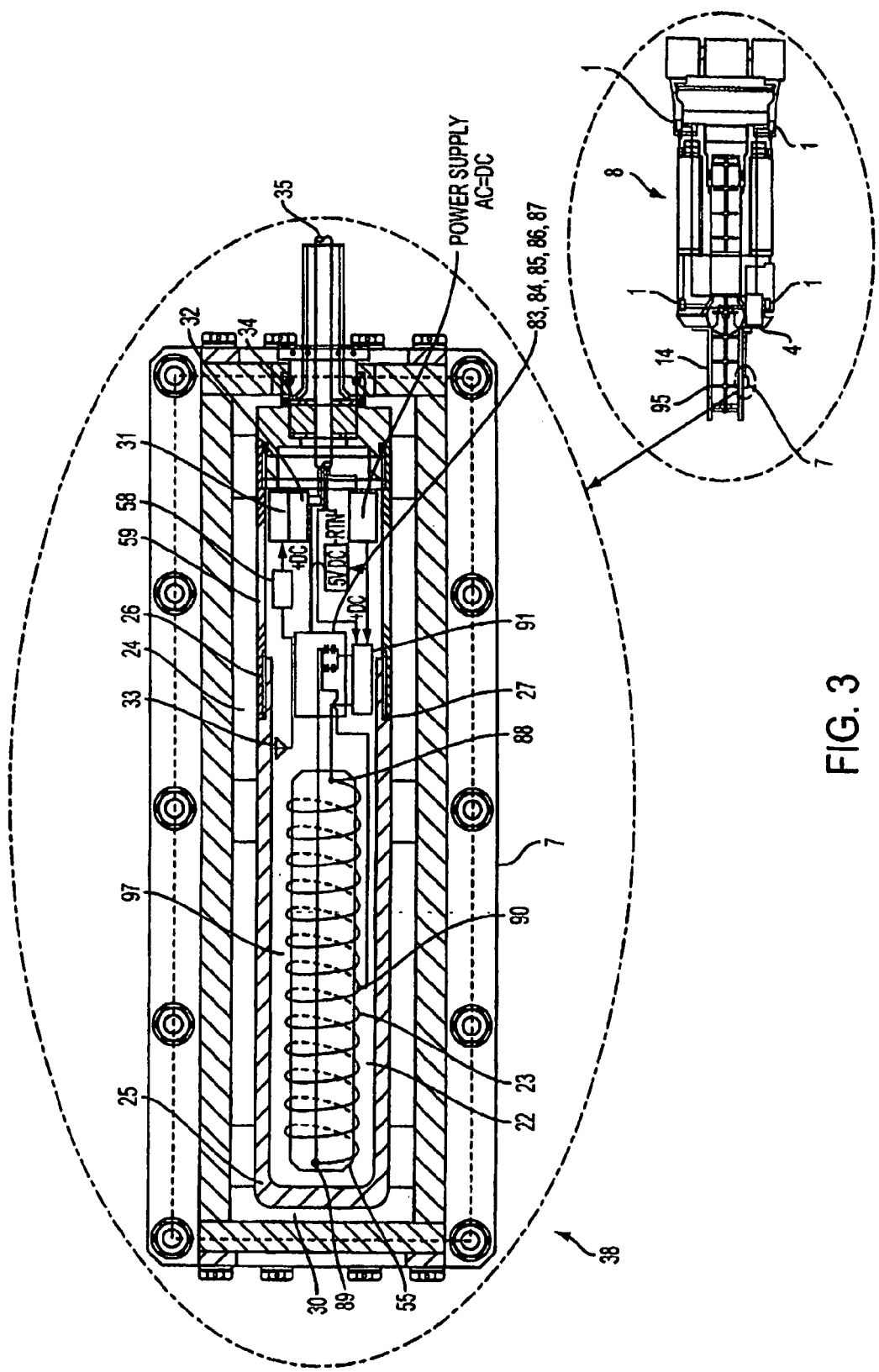
FIG. 3 is a diagram showing elements within a Master Marker Field Generator.

A diagram of a marker field generator is shown in FIG. 3. This generator accomplishes multiple functions: (a) generating a 73 kHz marker field; (b) receiving RF transmissions from PADs and transmitting them through cable; and (c) radiating a 345 kHz signal. These functions will be discussed separately.

An externally generated signal is received by the FET amplifier 91. This amplifier produces a current which is fed into the transfer switch 83, which then passes through a set of normally closed relay contacts 84, through a set of capacitors 86, and on to one end 89 of the winding 23, passes through the winding 23 around the ferrite rod 55, exits the other end 88 of the winding 23, and returns to the amplifier 91. Crucial to operation is that the reactance of the inductor 97 created by the winding 23 and the ferrite rod 55 be equal or nearly equal to the reactance of the capacitors 87 at the frequency of operation, which has been chosen in a preferred embodiment to be 73 kHz. With the reactance being equal for the inductor 97 and the set of capacitors 87, a series tuned circuit is created. The currents and voltages within that circuit will be amplified according to the "Q" of the circuit. A tap 90 on the winding 23 allows reducing the inductance for the 345 kHz, but the size of the capacitors 87 must be varied to correspond. Anyone reasonably familiar with electrical circuitry will be knowledgeable as to how to choose a suitable combination of impedance characteristics to achieve resonance.

Figure 9:
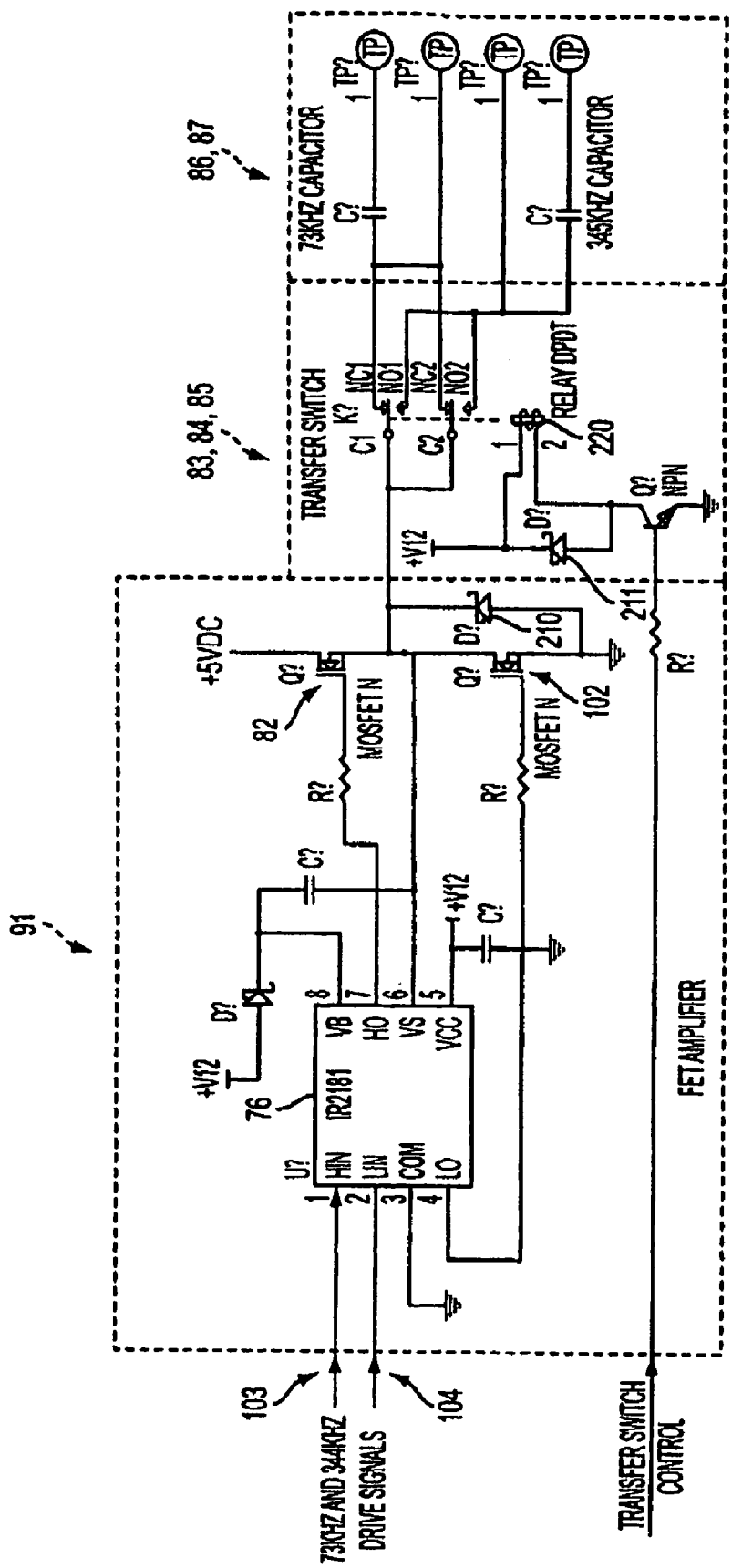
FIG. 9 shows an FET amplifier and transfer switch.

Additional details on the FET amplifier circuits are provided in FIG. 9. Special requirements imposed on the amplifier by the tuned resonant circuit require a specially configured arrangement. When producing 73 kHz current pulses, the two signals 103, 104 from the MCU 75 in the Display 4 are 180 degrees out of phase and separated by the amount required to make sure the FETs 82, 102 are not conducting simultaneously. The diodes 210, 211 have been added to protect the electronics from excessive voltages generated by the relay coil 220 or the tuned circuit.

The size of the marker field produced by a generator is a function of the current passing through the winding around the inductor. A series tuned circuit was selected here so that a low voltage is adequate to produce the desired current. Five volts is used as an input to the FET amplifier 91 in order to produce a current of approximately 0.75 amperes. These parameters are exemplary as there are many possible combinations of inductor size and currents that will produce a suitable marker field. A range of 0.25 amperes to 2.0 amperes is recommended. A person skilled in the art can select combinations that they prefer.

The ferrite rod 55 selected for this arrangement is approximately 1 inch square and 6.5 inches long, made from type MN60 ferrite material which is manufactured by CMI. This is an exemplary embodiment as other selections of material types are possible. This type is a reasonable balance between requirements for transmission and receiving for both low and medium frequencies.

Resonant circuits contain large circulating currents, the characteristic that makes them desirable for FGs since the size of the marker field is proportional to the current through the inductor. With an input voltage of 5 volts and a Q of 25, the voltage across the inductor and across the capacitors will be approximately 125 volts. In order to safely use a FG in an environment that may contain explosive concentrations of dust or gas, the electrical components required to make a FG should be enclosed inside an X/P housing. It may be possible to design a FG such the inductor is not within a X/P housing, and still meet safety requirements, but use of a X/P housing to enclose the entire FG is the safest approach.

The Schiffbauer '986 patent teaches the conventional method of producing an oscillating current for driving the tuned circuit for generating the marker field. The amplifier 91 would be a linear amplifier, driven by a sine wave signal having the desired frequency. A more efficient method can be employed. Referring to FIG. 9 two field effect transistors (FET) 82, 102 have been employed in the FET amplifier 91 to amplify signals to produce the 0.75 amperes selected for this configuration. To maximize efficiency, the signal to be amplified should be a square wave, rather than a sine wave. However, given the frequencies involved and other electrical parameters, there are problems with using FETs in this manner. Due to rise and fall times of these devices, when configured for this purpose, care must be taken to ensure that both are not conducting at the same time. This is accomplished by requiring that two separate signals 103, 104 be fed to each FET 82, 102, such that there is time for one to completely turn off before the other is turned on. A driver chip 76 amplifies the input signals 103, 104 for input to FETs 82, 102. Other details of the circuit in FIG. 9 will be obvious to one reasonably skilled in the art. The method for producing this special signal is described later as part of the Display 4 where these signals will be produced for all FGs.

The second function of the generator depicted in FIG. 3 is to receive signals from PADs 53. The PADs measure the strength of the marker field and determine if it is within a Warning Zone 10 or a Stop Zone 11. That information, the I.D. of the PAD 2, battery status, and commands issued by the worker 13 using the PAD 2 is transmitted through an RF link 92. The receiver portion 58 of the RF link 92 is included inside one of the FGs, called a Master Marker Field Generator (MFG) 7, as shown in FIG. 3. An antenna 33 located inside the non-metallic portion of the MFG receives the signal via the RF link 92, including the data stream it carries, and passes it on to a micro-controller (MCU) 31. This MCU 31 receives the information, tags it with the I.D. of the PAD 2 that has sent the message, temporarily stores it, and then waits for an instruction from the Logic Module 5 to transmit the information to the Logic Module 5 through the cable 35. A driver chip 32 boosts the signal before it enters the cable 35. Details about the routing of power for the various chips and electrical elements are not described but can be designed by one skilled in the art.

An important consideration is that there will be multiple PADs (not shown) other than the PAD 2 shown in FIG. 3. The MCU 31 receives data streams from the PADs which are sent in random bursts, updates the information for each PAD as the information arrives, and then shifts the data out to an outside element when requested, as explained above. More explanation about the data sent by the PADs will be given in the later discussion about the PADs.

The third function of the FG is to radiate medium frequency signals for purposes of communicating between CMs and to transmit to external locations safety information and other information about the operation. This is accomplished by switching relays 84 and 85 to establish the configuration of the system so that it can produce oscillating magnetic fields at a higher frequency. A second frequency of 345 kHz has been chosen for the configuration of the preferred embodiment being described. The pair of signals 103, 104 used to drive the FETs can be modulated in order to carry information, so long as the bandwidth requirements are not excessive. A slow data rate of 1000 bits per second is adequate and easy to produce with the technique used in the Display 4, which will be described later. A simple PCM format is adequate.

Resonance at 345 kHz requires that the inductance and capacitance be reduced by a factor of approximately 4.7. As explained earlier, other combinations can be used, depending upon design preferences and other factors. Assuming 22 turns was selected for the winding 23, the tap 90 on the tenth turn of the winding will reduce the inductance by approximately a factor of 5. A second set of capacitors 87 can be selected to return the circuit to resonance at 345 kHz. Standard textbooks fully explain the considerations and details in making these adjustments. With the circuit re-tuned for 345 kHz, the XFR switch 83 will switch the current through this alternate path whenever the higher frequency is needed. The decision to switch between the desired frequencies will be commanded by the Logic Module 5 in the Display 4.

Also shown in FIG. 3 is a structural shield 38 around the X/P housing containing the active elements of the generator. Although routinely done for many other kinds of electronics, placing a FG inside a X/P housing offers some interesting challenges which were summarized in the General Description of this specification and will not be repeated here. It is rather obvious that the UHF antenna 33 must have a view to the outside that is not obstructed by metal. It may not be obvious that special provisions have to be made for the inductor as well, and the provisions for the inductor 97 are very different than for the UHF antenna 33. One reason that the low frequency range is desirable for a marker field is that it is not affected very much by the proximity of metal objects. If a piece of steel is placed in the magnetic field, the field in the near vicinity of the metal will be significantly altered but the effects are negligible at more than a few diameters of the piece of metal. This is true even if the steel is as large as the inductor and is placed near the end or the side of the inductor. Even the huge structure of a CM will not substantially affect the shape of the field in the direction away from the CM. From this, one could easily conclude that the performance of a field generator will not be affected by being placed in a metal housing. This is not true. Metal that circumferentially surrounds the inductor, even over a small region, will degrade its performance.

Notice in FIG. 3 that one section 59 of the housing 24 has been made from stainless steel and the other section from polycarbonate 25, with the two sections 25,59 connected by threads 26. An "O" ring seal prevents water or dust from entering the housing 27 but is not part of the X/P capability. Length of the flame path through the threads 26 is the primary protection from flame propagation.

Polycarbonate section 25 is not only transparent to magnetic fields, including radiated RF such as UHF, it is occasionally used as a part of X/P housings, especially for windows that allow one to see contents inside of an X/P housing. Polycarbonate, in the form of a flat plate 28, is used for the window 29 on the TramGuard Display 4, shown in FIG. 1. It is also suitable for making an X/P housing for a marker field generator. The exemplary polycarbonate section 25 in FIG. 3 is made 0.23 inches thick on the sides and 0.375 inches thick at the end.

Ferrite materials are easily broken by relatively low levels of shock. Any devices attached to an outer portion of a CM will experience significant shocks from time to time. Therefore, the ferrite used in the MFG must be properly supported to prevent breakage due to large movements within its support. Non-metallic supports are preferred so that they can be made to go around the circumference of the rod without reducing its efficiency. One requirement on the method of support is that the ferrite not move even small amounts within its supports. This requirement, when combined with the need for a uniformly distributed current carrying winding 23, leads to the desirability for using a flat copper conductor for the winding. A copper material that is 0.10" thick and 0.375" wide works well for the power range required for this application. Windings having less cross sectional area will have a lower Q and thus produce lower currents in the resonant circuit. In order to produce a suitably sized inductance in the range of 10 micro Henries, approximately 22 turns is recommended. Increasing the length of the ferrite 55 increases performance and increases the inductance. Given the space requirements, a 5" to 7" ferrite rod is a good balance between size and performance. Other configurations are possible depending on system requirements. By use of the flat winding 23, it is easier to fashion a support that will uniformly transmit loads as a result of shocks to the MFG 1. But, the supports must, themselves, be firmly supported. Good control of dimensional tolerances is required. Machining a cavity into a polycarbonate rod works well. The depth of the cavity 22 in the polycarbonate portion 25 of the housing must be made so as to provide axial compression of the ferrite 55 and end support 30 as the housing sections 23, 25 are threaded together.

Location of the Master Marker Field Generator should provide a line-of-sight to the PADs. Due to the environment and the equipment being used, that is not possible. However, as is depicted in FIG. 1, mounting the MFG 7 on the loading boom 14 is the best choice available. There is less obstruction by the rest of the CM in this location than for any other position. During tramming, some times the operator may actually be in front of the CM. Therefore, the squelch setting for the receiver 58 in the MFG to reject signals that are low in strength and/or noise, should be adjusted low enough to detect signals from a PAD in that location, and generally to detect signals from a distance of preferably about sixty feet. It can be seen in FIGS. 1,2,3 that the MFG 7 that the preferred location of the generator is the loading boom 14.

Figure 5:
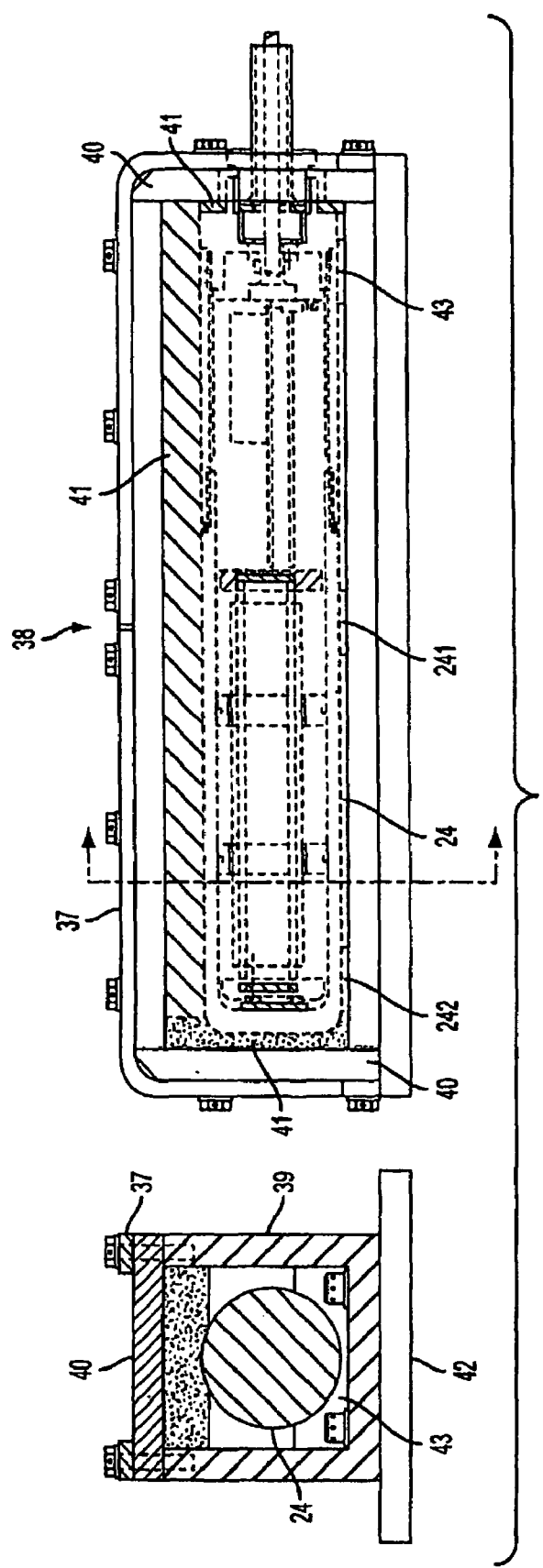
FIG. 5 shows the cross section of a Master Marker Field Generator having a channel with a non-metallic cover.

Except for the inductor 97, the UHF receiver antenna 33 and possibly some of the capacitors in the tuned circuit, all other electrical elements are located within the steel section 59 of the MFG 7. Here, the components are shielded from stray capacitance from external objects or personnel. Heat from the electrical components is conducted away by the metal housing to the external structure of the CM. A metal saddle 43 (shown in FIG. 5) supports the end of the X/P housing 24 near the gland assembly 34 (shown in FIG. 3). An X/P approved gland assembly 34 is provided to seal around the cable 35 as it enters the MFG.

It does little good to place electrical components inside an X/P housing if the housing is likely to be crushed during use. Experience has shown that most anything attached to the outer surface of a CM will be crushed or be ripped off. Design and mounting of any item to be attached to the side of a CM must be done very thoughtfully. First, the item must have a low profile. Second, it must have a rugged exterior that can withstand high forces and repeated impact from mining materials. Third, it must be firmly attached. Finally, it should be mounted in a depression or cavity to reduce the amount the device protrudes outside the envelope of the CM. Fortunately, there are locations on the CM where natural "depressions" already exist so that if the profile of a FG or MFG is kept sufficiently low, the effects of scrubbing the walls will be minimized. These "natural" locations are used as first choice but special construction may, in some instances, be required to provide the desired field of view and the desired degree of protection. A "depression" can be produced by cutting a hole in a side plate and mounting the FG in that hole. Alternatively, heavy pieces of metal may be welded onto the surface of the CM so that the low profile device positioned between these raised areas will be adequately protected since the MFG is designed to have a low profile.

FIG. 3 shows a mechanical shield 38 around the X/P housing 24 to protect the X/P housing. These details and other can best be seen in FIG. 5. The channel 39 provides a low profile while providing thick aluminum sides to protect against crushing. Elastomeric pads 41 cushion the ends and top. Metallic bands 37 are applied to each side of the top and end panels 40 to protect the edges from being broken. Bands 37 applied along the length of generator do not significantly affect performance. Standard channel sizes may be used, though they may not provide for the minimum possible width of the assembly. Metal must not be placed over the top of the channel 39 since that will reduce performance. Applying a non-metallic panel 40 such as polycarbonate over the top of the channel that is at least ½ inch thick is needed.

A mounting plate 42 is provided, which can have differing dimensions and hole patterns to simplify installation. An important detail is that a metallic saddle 43 (see also FIG. 5) is provided between the metallic portion 59 of the X/P housing and the channel 39 to conduct heat away from the housing 59, and in turn conduct heat away from the electronics inside the housing 24. This metallic saddle 43 is made from steel having high iron content so that the effects of mounting the assembly onto the heavy metal CM structure will be reduced so that re-tuning of the series resonant circuit will not be required at the time of installation. Two additional saddles 241 and 242 are non-metallic. Cushioning materials are placed above the X/P housing to keep it pressed against the saddles. Note that the saddles around the ferrite portion are made from non-metallic materials.

Figure 4:
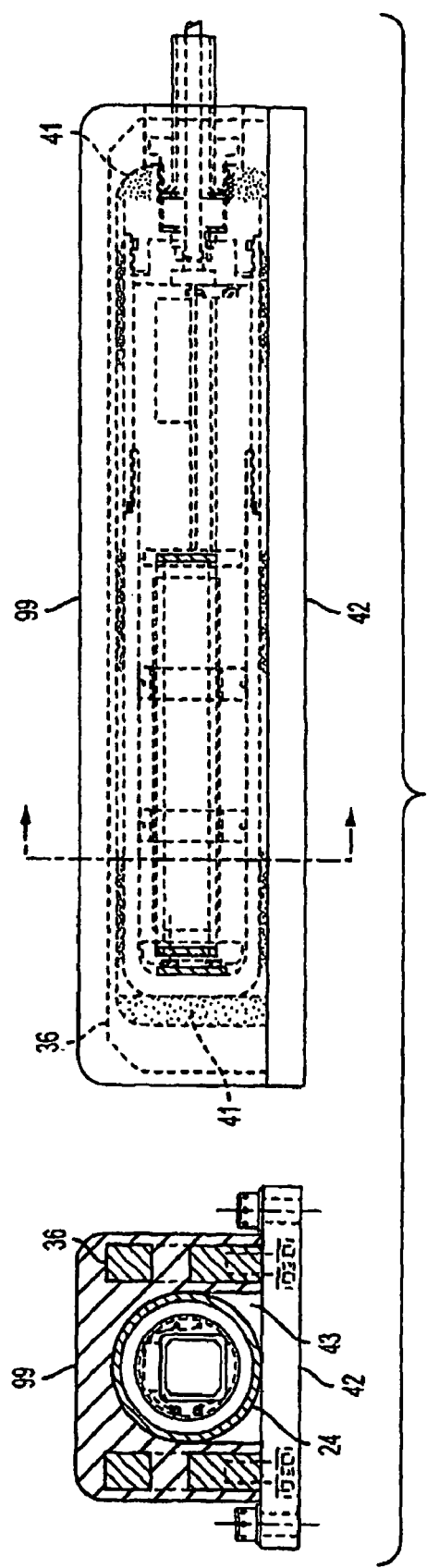
FIG. 4 shows a cross section of a Shield for a Master Marker Field Generator having a reinforced molded cover.

A preferred embodiment for a generator shield is shown in FIG. 4. It provides a minimum profile cover 99, which is cast into a single piece with walls 99 that are at least 0.75" thick, using a strong, tough non-metallic material such as Hapcast 3736, available from Hapco Co. Inc, Hanover, Mass. Additional protection from crushing is provided by adding metal panels 36 in the side walls, molded into place. It also utilizes features for the previously described configurations such as cushioning 41 on the end 41, metal saddle 43, and mounting plate 42.

Figure 6:
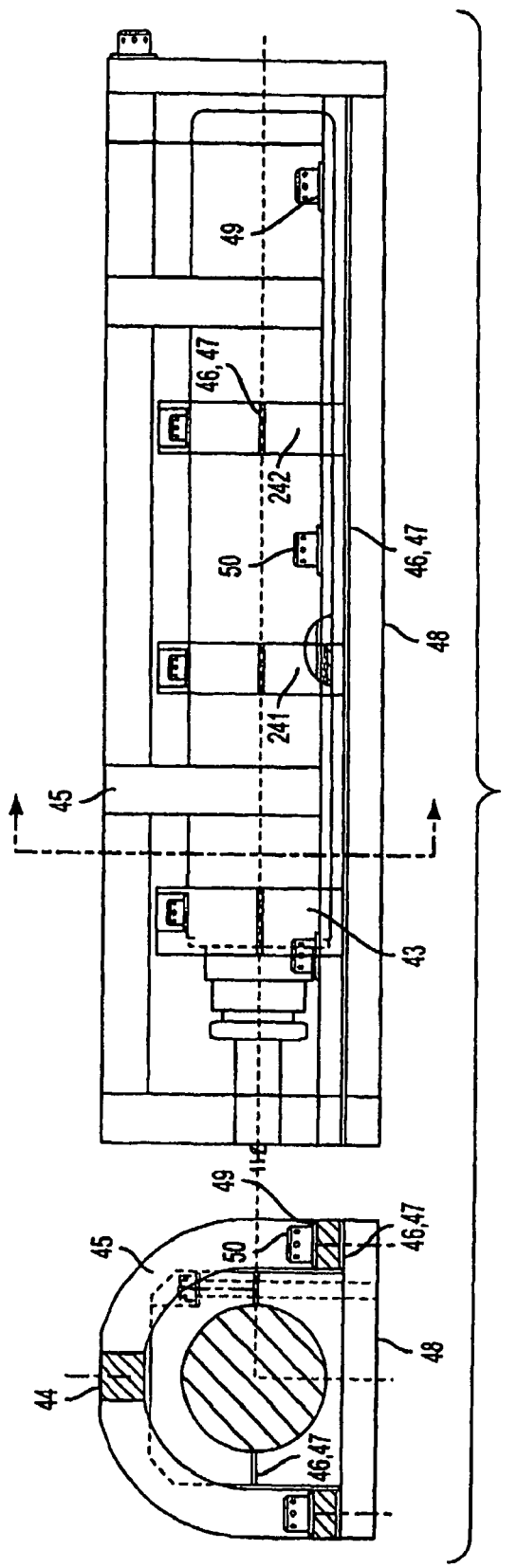
FIG. 6 shows a Marker Field Generator enclosed with an open-type shield.

It is possible to shield the generator by use of an open-type shield or guard 44 as shown in FIG. 6. It offers the advantage of having steel ribs 45 that go across the top of the generator. These metal ribs 45, in combination with the mounting plate 48 encircle the ferrite inductor 97, which has negative aspects, as discussed in earlier paragraphs. In order to use such a construction, there must be a gap 46 in the metal paths in the circumferential direction which can be achieved by adding a material such as silicone rubber 47 between the ribs 45 and the plate 48. The silicone rubber 47 can also be used in the gaps 46 in the saddles 43, 241 and 242. Non-metallic washers 49 between the bolt heads 50 are also required.

Most applications for TramGuard™ are not as harsh as for CMs so that some of the provisions described above are not necessary or can be done more simply. In most other applications, there is no need for an X/P housing. Much lighter materials may be used. Many applications will provide exposure to water, dust, or other materials that must be kept away from the MFG electrical elements. For example, if a MFG is mounted on the back of a truck, above the bumper, is not likely to be impact by heavy objects. Yet, it will still likely experience significant abuse in the form of abrasion and impact from materials being transported and other incidental impacts. Therefore, the channel 39 may be fabricated using thinner aluminum, perhaps 0.125" thick. The stainless steel housing around the electronics might be made from 0.032" aluminum tube. It will typically not be practical to provide a display in locations such as at the rear of a truck. In order to show to the workers that the active loop between their PAD and the MFG on the truck is working, LED indicators 80 (FIG. 1) are provided in the transparent polycarbonate housing. Whenever a PAD is within the range of the UHF receiver in the MFG, a green colored LED will light, indicating that the PAD and its link is working. If the worker gets closer than the defined hazard zone, the LED display 80 will be lit in a yellow color. In applications where the mobile equipment has been outfitted with capability for a stop signal to be sent from the MFG, the LED display 80 will be lit in red when the stop signal is sent.

Figure 12:
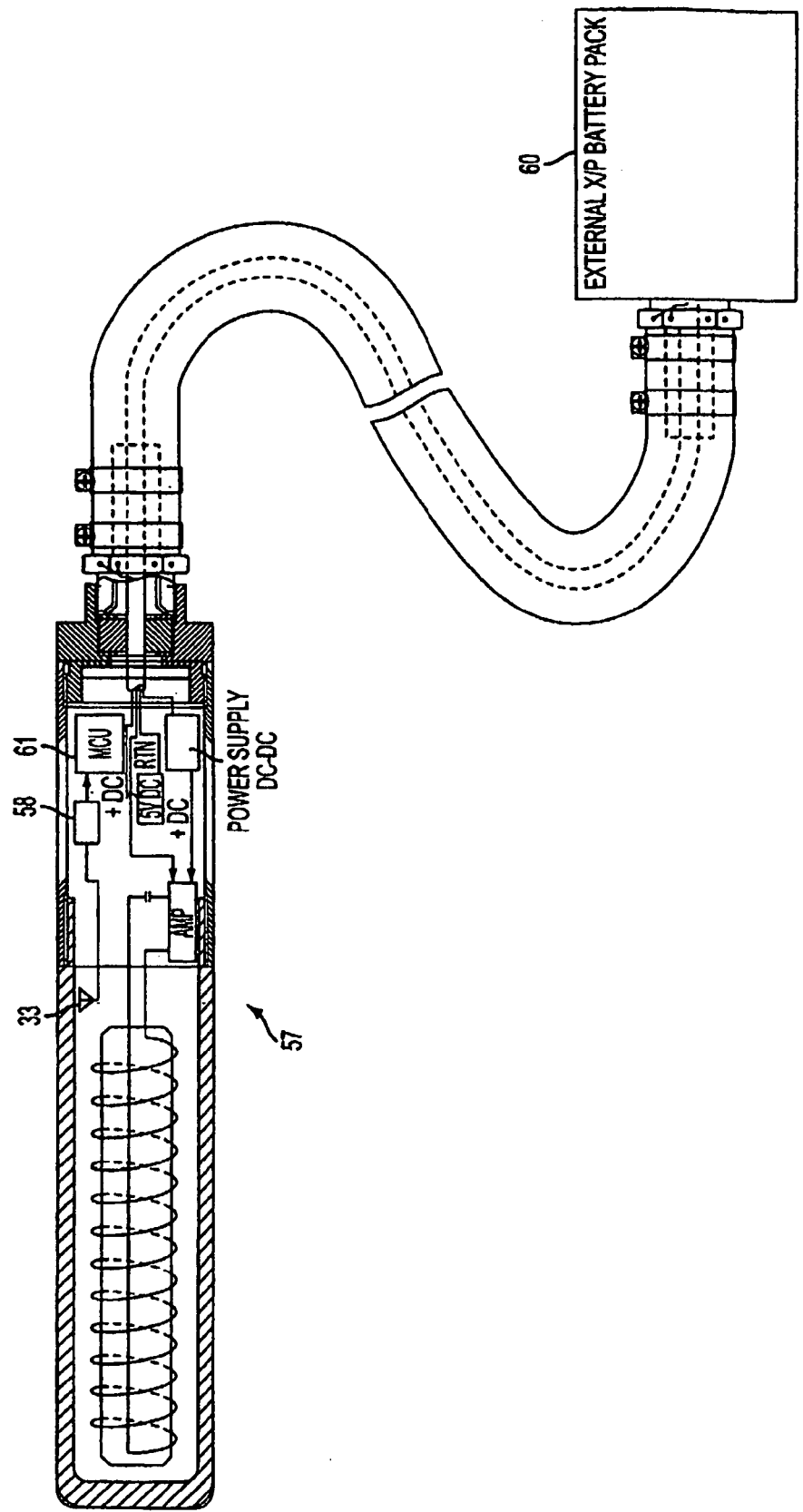
FIG. 12 shows a portable marker field generator.

Hazardous areas exist where a MFG and a worker's PAD would be a useful deterrent to workers exposing themselves to the hazards at that location. However, electricity may not be readily available for installing a MFG so there is need for a portable version, a Portable Magnetic Marker Field Generator (PMFG) 57, as depicted in FIG. 12. A shield would normally not be required for such applications. It can be seen that the generator has been modified to add a battery pak 60. In order to conserve power and extend the life of the batteries, the MCU 61 will turn off the 73 kHz marker field and the UHF receiver 58 for most of the time. After a period of time which can be adjusted by the software used in the MCU 61, the UHF receiver 58 is turned on for approximately 0.5 seconds, for example. If a PAD has entered within the range of sensitivity of the PMFG 57, it will then begin pulsing the marker field at a rate that can be selected. Once a PAD reports that it has detected the marker field, the PMFG 57 will adjust the pulse rate of the marker generator.

There are some general requirements for a PAD which should be understood before considering the specific details. The mining environment around a CM is very dynamic. Miners are confronted by many hazards which they avoid by use of good procedures, thorough training, and use of various safety devices. One concern when adding safety devices is that the distraction that they cause can increase safety problems in other ways. It is important that any control device be user friendly to minimize distractions yet and also to re-assure the miner that he understands his situation. The PADs must have these characteristics. Workers must wear a cap with a lamp, carry a sizeable battery for their lamp, carry an emergency breathing package, and carry various items that they are using. CM operators also carry a remote control for controlling the CM. Adding to this list items to be used by the worker is not a trivial consideration.

Figure 7:
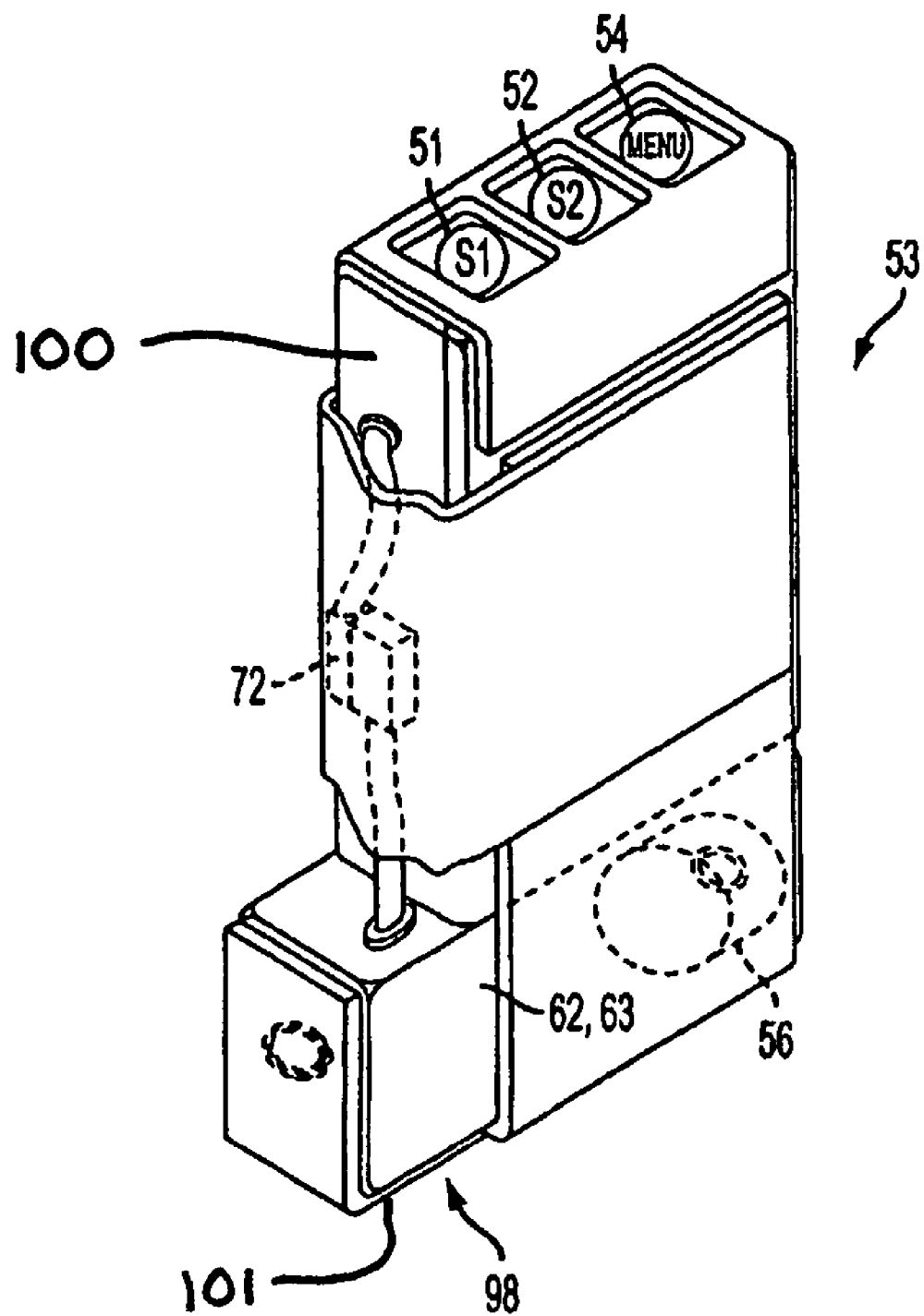
FIG. 7 shows a perspective view of a Personal Alarm Device and a Battery/Alarm pack.

Therefore, a PAD 53 should be as small as possible. It also should be configured so that it can be placed on the upper body in order for the audible alarm to be clearly heard and to protect the upper body which may be forward of the lower part of the body due to low roofs. A PAD 53 shown in FIG. 7, configured to fit into a miner shirt pocket or vest pocket has three switches 51, 52, 54. These switches are included on top where they can be reached with little difficulty. One is a menu switch 54 and the other two are selector switches 51,52 that when used in combination. These switches 51, 52, 54 are required for many important reasons. Inside the PAD 53 are sensing coils and circuitry to measure the marker field strength. At the bottom PAD 53 is a battery/alarm pak 98. It includes the batteries 63, the sounder 56, and circuitry to make the battery/alarm pak 98 Intrinsically Safe for use in coal mines. The battery/alarm pak 98 is removed to be recharged in a safe location and a second one is installed during charging of the first. The pak 98 is attached to the upper portion 100 by use of Velcro, for example. The upper portion 100 of the PAD 53 contains the logic and the PAD I.D. so that the miner can keep his own identified PAD 53 while the battery/alarm pak 98 is being charged. Installation of a battery/alarm pack consists of pressing Velcro flaps onto the assembly and connecting the cable/connector 72. In a preferred embodiment, there is no on/off switch so that the PAD 53 is operational any time a battery/alarm pack is connected. A sounder 56 is built into the battery/alarm pak 98 to provide the audible alarm to the worker if he enters a Warning Zone 10 or a Stop Zone 11. Safety circuitry 62, including two diodes and a resistor are added as required to satisfy Intrinsically Safe requirements. Wiring and spacing requirements for I.S. must be included in the physical arrangement. A charge port 101 is provided on the bottom of the assembly 98.

Figure 8:
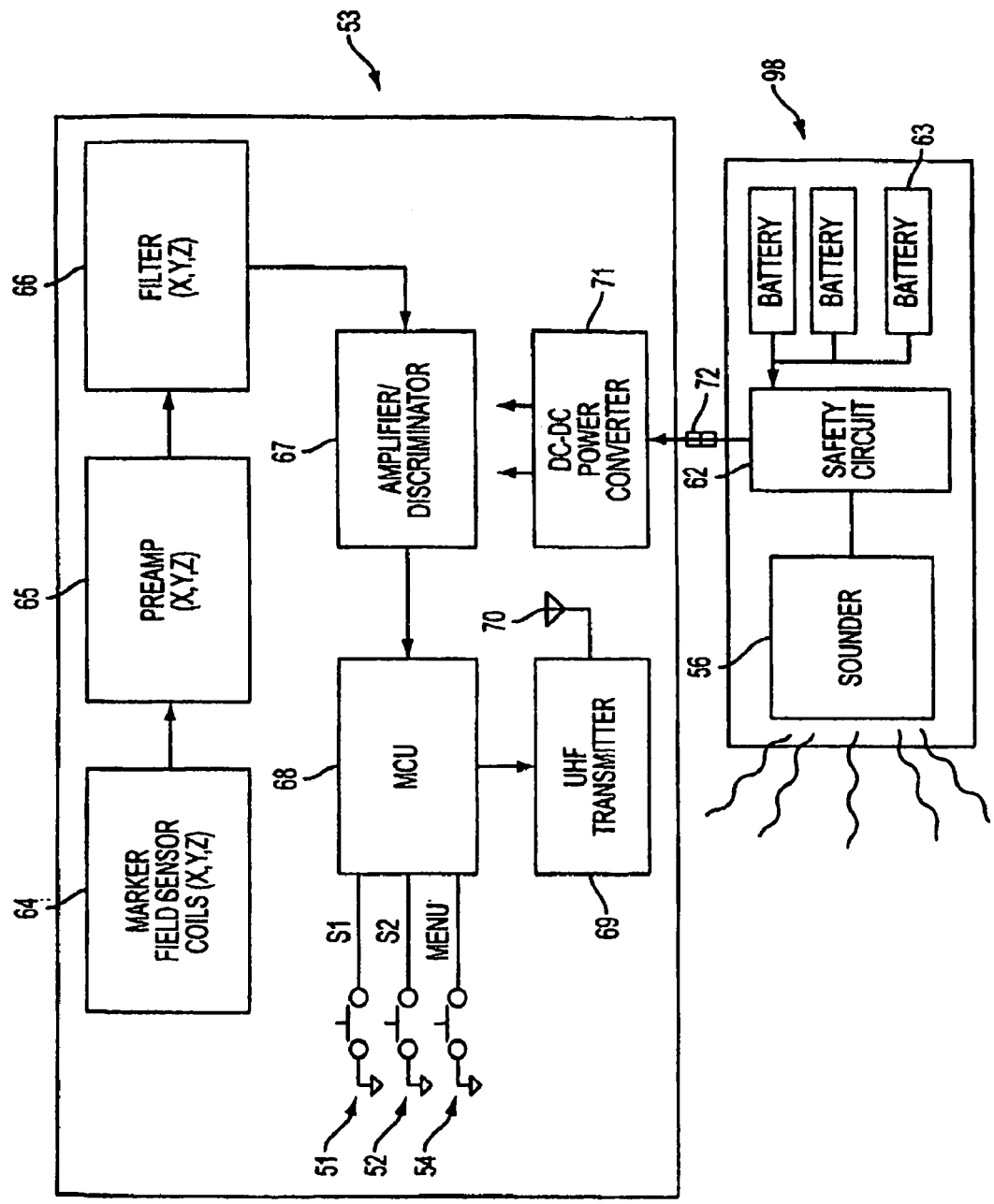
FIG. 8 is a block diagram of Personal Alarm Device electrical elements.

Circuitry inside the PAD 53 is shown in block diagram fashion in FIG. 8. Sensor coils 64 detect the marker field in three axes, output voltages to a preamp 65, which is then passed through a filter 66. Once filtered to the proper bandwidth it enters a discriminator/amplifier 67. The details of the functions that must be performed by these elements are adequately described by the Schiffbauer '353 patent.

Important to the PAD 53 is a micro-controller (MCU) 68 which not only measures the levels of the signals from the circuits that are sensing the marker field, but also measures the voltage of the batteries 63 in the battery/alarm pak 98. A suitable choice of MCU is a PIC18F252. The MCU 68 also reads the three switches 51, 52, 54 and performs various logical and processing functions. The results of the MCU 68 processes are then sent to the UHF transmitter 69 to be sent to the MFG 7 and on to the Display 4 through a cable.

Each PAD has an I.D. code. Transmissions from the UHF transmitter 69 thru antenna 70 will be made on a random basis in 5 ms bursts within transmission windows of 0.25 seconds in duration, for example. This allows multiple PADs to operate simultaneously with minimum conflict. Each transmission will include the I.D. code. Switch functions sent in this way can then be interpreted by the rest of the TramGuard™ system and be acted upon. Some of the many useful ways this remote control capability can be implemented are described in the discussion on the system.

It has been learned that warning sounds are not always effective after they have been heard a few times. For this reason, a sense of urgency is produced by the way the sounds are emitted from the sounder 56. For example, when the PAD first begins to detect a magnetic marker field it will notify the miner with a short beep that is only repeated every 5-10 seconds. This lets the miner know that he is approaching a CM or that one is approaching him but there is no cause for alarm. If the CM gets close enough to the worker to cross the Warning Zone 10 distance, the MCU 68 will begin sending a beep to the sounder that would typically have a 50% duty cycle. But, if the field strength continues to get stronger, the space between pulses of sound will reduce, ending in a constant sound at the point that the miner is within the Stop Zone 11. This arrangement provides a sense of urgency to produce a more effective alarm. The many consequences of and responses to the signals sent from the PADs are discussed further in a later discussion about the system.

Typically, three AA size nickel metal hydride batteries will provide operation for a few days, depending upon the amount of alarms being made. If there is a desire to relocate the battery alarm pack 98 to another location on the person of the worker, the length of the cable can be extended. Power could also be provided from other sources such as the cap lamp battery, if the required resistors, fuses, diodes are included as required to make the alternate power source Intrinsically Safe. A vibrator can be added to the battery/alarm pack 98 or can be added to the miners cap. Likewise, the audible sounder 56 could be relocated into the miners cap if that were desired so long as regulations for Intrinsically Safe designs are followed. Relocating the power source or the sounder 56 should not impact the design or construction of the PAD. The PAD could be attached to the CM Remote Control unit.

Figure 10:
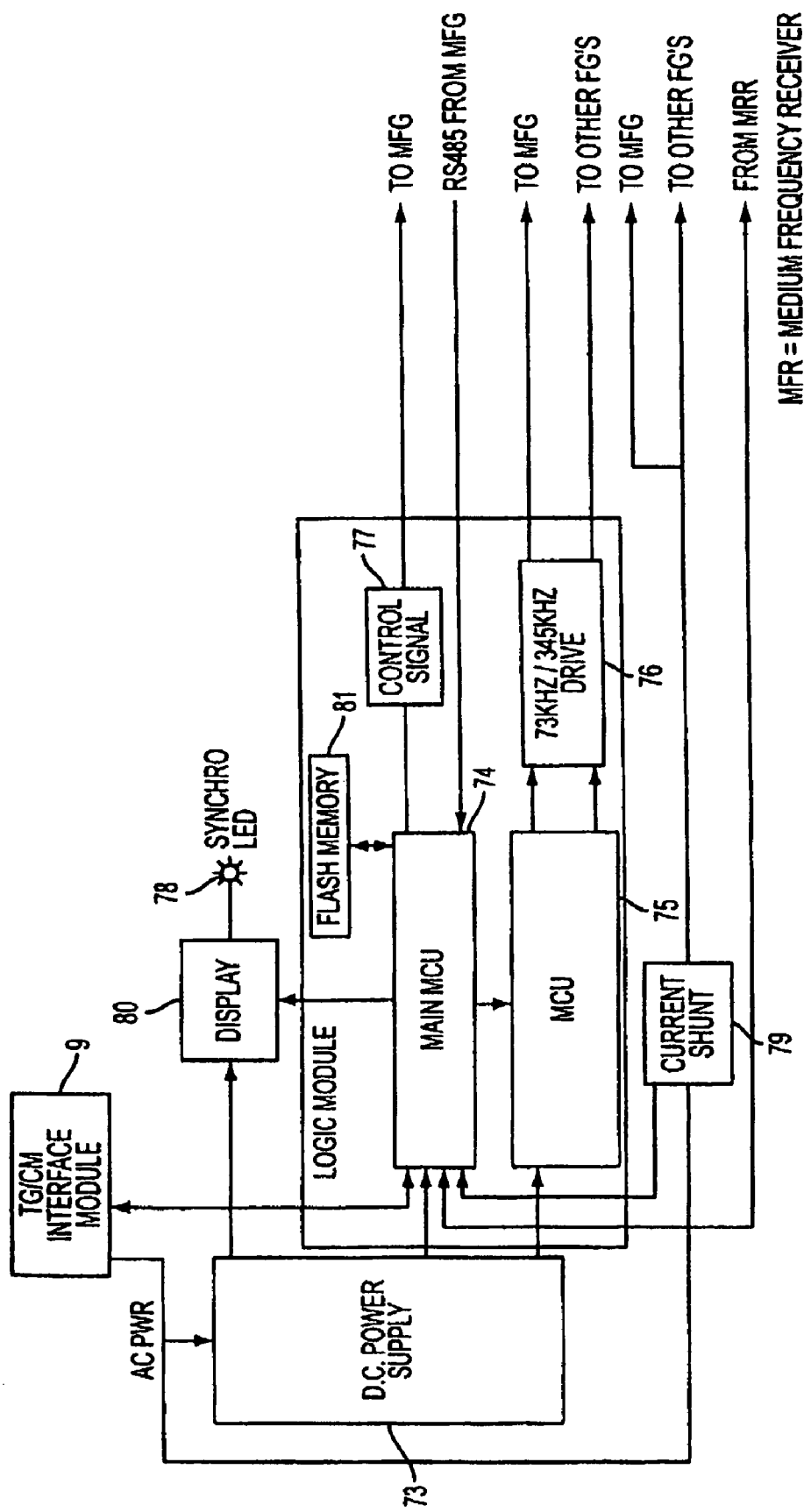
FIG. 10 is a block diagram of a Display.

PADs originate information and commands from workers. These commands and information are transmitted to the MFG where they are temporarily stored before being sent to the Display 4 using, for example, standard RS485 protocol and chips. Elements in the Display 4 are shown in FIG. 10. Power from the CM to the TramGuard™ system is obtained through the TG/CM Interface Module 9. From this, 5 volts is produced by the power supply 73 for the electronics. The CM power is also routed through a current shunt 79 to supply power for the Field Generators 1,7. The output from the shunt 79 is sent to the MCU 75 so that the current to the FGs can be monitored. If the current level drops as much as 10% from it normal value, a yellow "FG" will be shown on the multi-colored LED display 80. Dual square waves, 180 degrees out of phase, and properly separated to preclude conflict, are sent from the MCU 75 to the Marker Field Generators and to the Master Marker Field Generator. These signals are then used in the generators 1,7 to drive the FETs which produce the current for the resonant generator circuits.

Data from the Master Marker Field Generator is received through an "RS 485" and processed by the Main MCU 74. Data from each PAD within range, up to a maximum of 10, for example, will be received and stored in flash memory 81 each 100 milliseconds. A report from any PAD that any miner is within the Warning Zone will result in the Display LED showing a yellow "W" and a report that any PAD is within the Stop Zone will result in the Main MCU 74 sending a command to the TG/CM Interface Module to stop the CM. If there are commands, from any PADs, they will be serviced. If any miner has issued a Panic Call by simultaneously pressing the "S1" 51 and "S2" 52 switches, the Main MCU 74 will send a signal to relays in the TG/CM Interface Module 9 to stop the CM 8. If the operator has requested the menu option by pressing the "Menu" switch 54, the Main MCU 74 will display the most recent menu option. Pressing the "Menu" switch will cause the menu to scroll through the menu options. Selection of a menu option will be made with switch "S1". Some of the options are Reset, Re-Activation, Battery Voltage Reading, and Synchro Transfer.

One potential problem with an active proximity system is that an element of the system, such as the PAD, could be non-operative and that not known by the worker to be protected. This concern is particularly applicable to the CM operator. Therefore, if the PAD assigned to the CM operator is not identified for a period of time, perhaps a period of 30 seconds, the CM will be stopped. In order for the CM to know which PAD belongs to the operator, the operator must identify himself. To do so, when the miner arrives to assume the position of operator, he pushes the menu switch 54 to select ID, which will appear on the Display 4, then holds down "S1" for a minimum of two seconds, for example. The Logic Module in the Display will replace the ID for the previous operator with the new ID for the current operator. Having the capability to assign a unique identity for the operator permits assigning certain commands and communication functions to the operator only.

The events recorded each 100 ms will be recorded until the memory is full after which time the oldest data will be lost. Current technology allows recording many days of activities. In case of a problem, the data can be downloaded. During cutting, the Main MCU will recognize the cutter on signal and will switch the frequency sent to the generators from 73 kHz to 345 kHz and send summary data of major events since the last transmission. Examples are any incursions into the Warning Zone or the Stop Zone and the I.D. of the PADs. Any Panic Calls will be recorded. The status of certain CM signals at the time of any safety event will also be transmitted.

Communications in mines has always been less than desired. A variety of modern hand held point to point radios, intercom systems, and general communications systems have been introduced in recent years. Each type communications system offers advantages and has certain limitations. A complete, ideal solution is not yet available so that there is need for improvements. In areas being actively cut by CMs communications have added limitations. It is often very difficult, if not impractical, to keep "leaky feeder" cables strung into the work area as it is being formed. A break anywhere in a leaky feeder system, which is difficult to prevent in this harsh environment, interrupts communications. In addition, the pieces of equipment are going into newly cut tunnels so that line of sight is generally not possible. Space in this specification will not allow elaboration on the many aspects of the situation but a couple of examples will be cited.

When there is a major incident such as an explosion, fire or major roof fall, it is important to know where the miners were located prior to the incident. Each PAD 53 used in the TramGuard™ system contains an I.D. code. As a PAD-carrying worker approaches a CM, the UHF transmitter in his PAD will be identified by the Logic Module 5 in the Display 4, even before his PAD can detect the marker field. In FIG. 10 a diagram is provided for the Display 4 which indicates the presence of a flash memory device. Approximately every second, information is buffered in the flash memory, which may be retained for a period of weeks. In addition, the information is transmitted out through the MFGs to an external monitor as is explained later. By this process, there will be an external record, which can be continuously monitored above ground, if desired.

In the earlier discussion of MFG details it was mentioned that the MFG would be able to transmit at frequencies in the range of 345 kHz in addition to generating the marker fields at frequencies in the range of 73 kHz. Whereas the low frequency 73 kHz essentially do not propagate, the medium frequency 345 kHz propagates quite well in a mining environment, along conductors such as along the cable trailing behind CMs. By placing a 345 kHz receiver near the power substation for a miner, it can be connected to the mine communication system to export out information sent to it from the MFGs over the 345 kHz frequency. Two miners cutting within the same unit, sometimes referred to as a super unit or as a synchronous operation, can be interlocked by use of the 345 kHz signals. Included would be the PAD IDs for each miner in the range of the UHF link and the history of each PAD entering the CM area or the warning zone or the stop zone and any Panic Call that any miner in the CM area may register.

Given a full menu capability with the use of three switches 51,52,54 on the PAD 53 and the large Display to show progress in moving through the menu choices, many forms of communication are possible. Included would be the transmission of special codes from any worker to the outside. This could be maximized by addition of a microphone to the PAD. A response to a Panic Call might be to enable the miner to speak into his PAD a message that would be transmitted to above ground to explain the situation that he has encountered. The Panic Call could be divided into two classes. The one being the standard Panic Call that results in the CM being stopped and a second version of the Panic Call could be initiated via the Menu on the PAD such that the voice link would be established without stopping the CM in case the emergency was not related to the CM. A Panic Call or CM disable would take priority over any other TramGuard functions.

Although most of the above discussions have been related to the CM, an integrated safety system such as TramGuard™ would also be useful on many other underground mobile equipments. They could also offer access to communications that typically would not otherwise be available. Also, MFGs could be placed at various places along the main transportation routes in the mine so that miners could use their PADs for communication to above ground. By integrating these many features into a single device, having many special capabilities, a major practical problem, i.e. proliferation of devices, is avoided.

Synchronous mining operations are becoming more widely used due to the overall improved efficiency that they provide. Two CMs work together within one mining unit and certain machines such as shuttle cars and pinning machines alternate between the two CMs. While one CM is cutting coal, it is being serviced by the shuttle cars while the second CM is tramming to a new location. The roof at the location which the second CM leaves is then bolted by the pinning machine. Due to safety requirements for ventilation, the two CMs may be constrained to not be cutting simultaneously. To implement this constraint, a system interlock is required. Verbal communication is not considered a sufficiently safe technique. With the MFG designed to have dual capabilities so that it can produce a 73 kHz marker field when a miner is cutting but then produce a 345 kHz field for communications when it is not cutting, this can be used to provide the interlock.

Figure 11A:
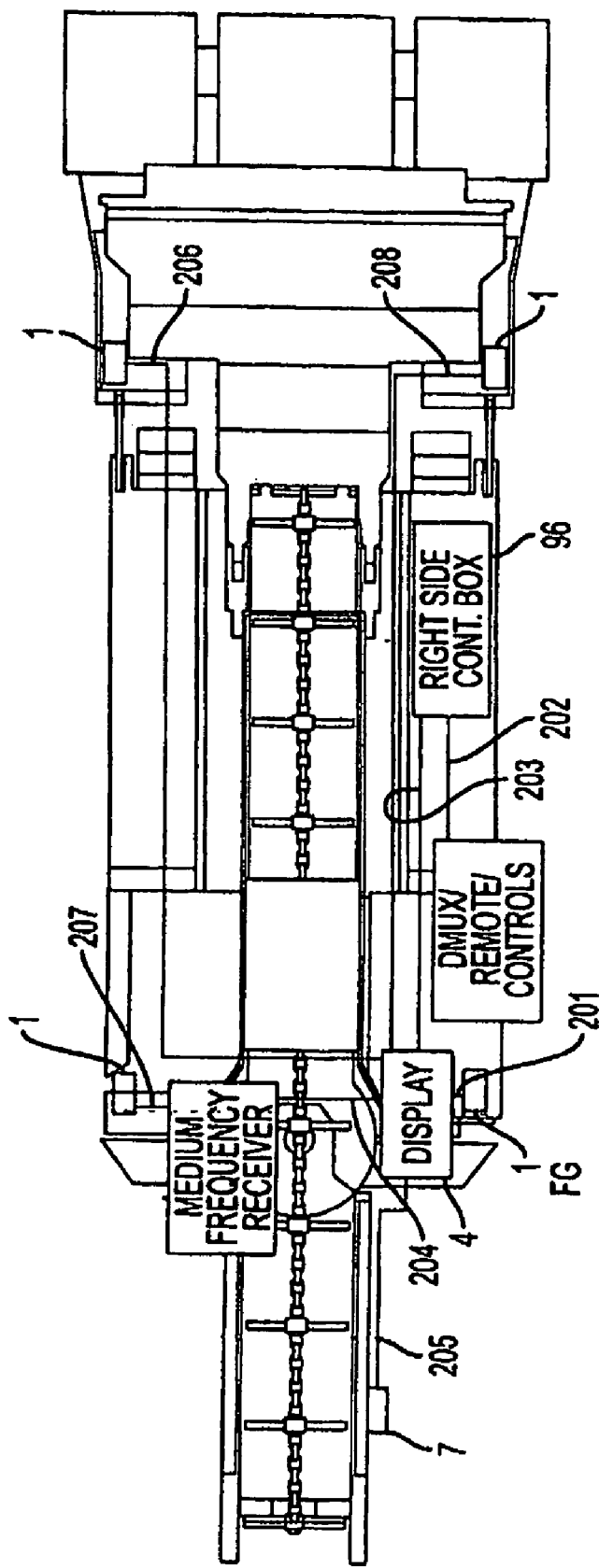
FIG. 11 is a diagram of a TG/CM Interface Module.
Figure 11B:
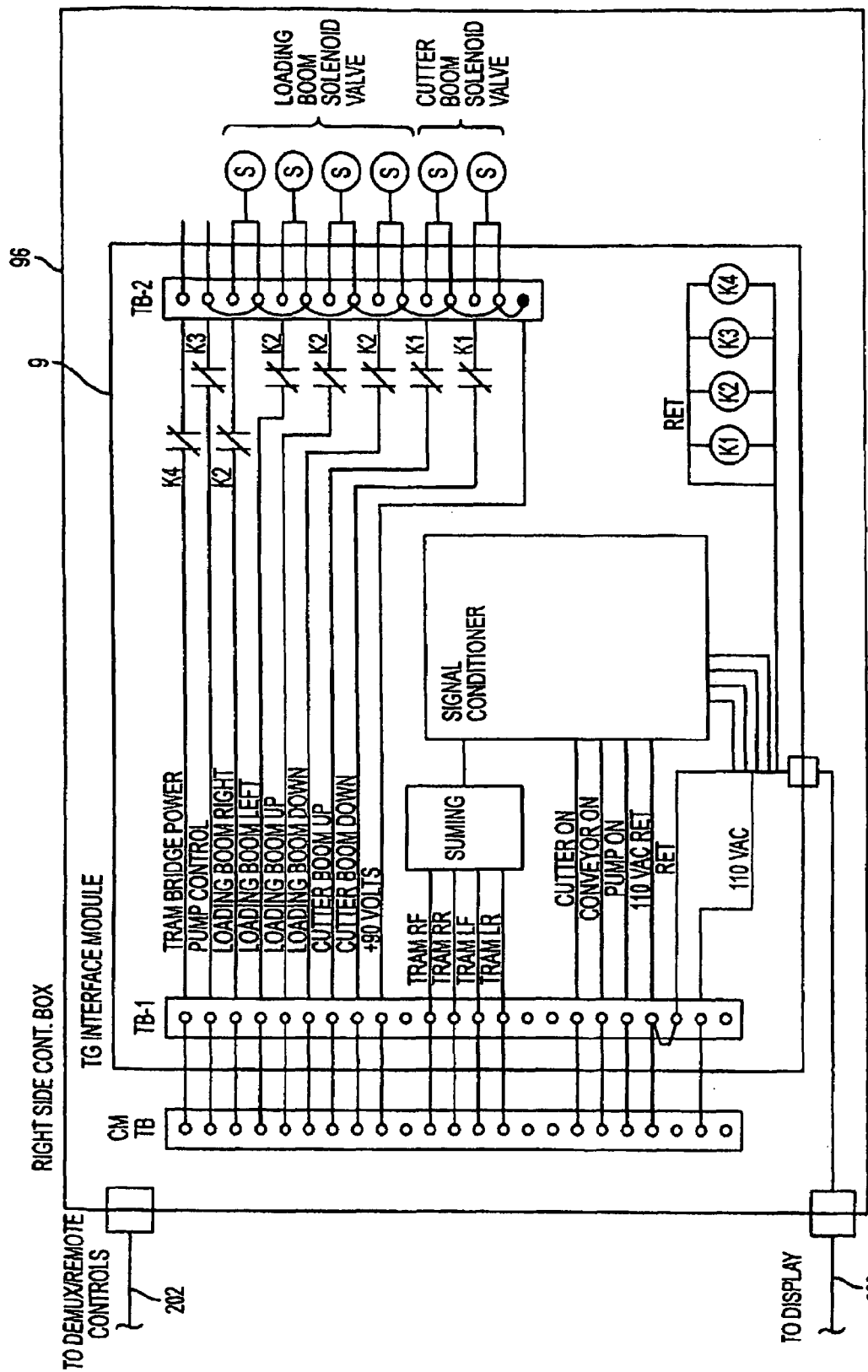

To complete the communications link, a receiver is required. The complexity of the receiver will vary depending upon the capability desired for the system. If information transmission is not of prime interest, but being able to interlock synchronous CMs is the prime interest, the receiver may be very simple. A circuit tuned to the operating frequency, followed by a filter and amplifier and an MCU will be adequate. A functional diagram indicating these key receiver elements is shown in FIG. 11.

Once a pair of CMs is configured with MFGs and simple 345 kHz receivers, interlock logic can be implemented. Although there are important additional sequencing details that will be summarized shortly, it should first be recognized that there is a natural match between the dual frequency capability of the MFGs and the dual operational status of the CM, as it relates to synchronous operation. In brief, when the CM is cutting the 345 kHz transmission should be on to keep the other CM locked out from cutting. When a CM is finished with a cut and wants to release the other CM to begin cutting, it will remove the 345 kHz signal and begin generating the 73 kHz marker field. As stated above, there is a sequencing detail that requires attention. It is not safe to use the absence of a signal to be the basis for beginning cutting. Therefore, when the one CM has completed cutting, the operator will select the Synchro Mode, as seen on the Display, by use of the "Menu" switch on his PAD. Using switch "S2" on his PAD he will select the "GO" option. The Logic Module will than forward the GO command to the MFG to be sent to the other CM which will result in it being given a GO status and the first CM will be locked out from cutting until the other CM returns a GO command.

A special LED single pixel indicator light 78 on the Display 4 will be lit whenever that CM is receiving the 345 kHz transmission from the first CM. Rather than transmit the kHz constantly, it will transmit in 0.5 second pulses. This will cause the LED indicator 78 on the receiving CM to blink once per second, telling the operator that his partner operator on the other CM is busy cutting. Data being transmitted through the kHz link will be drawn from the flash memory and be sent each half second. A low data rate in the range 1000 bits per second is adequate for the most critically needed information. If a Panic Call is initiated and an audio link is made available, 345 kHz would become continuous and the bandwidth would be limited to approximately 1.2 kHz which is adequate for good communications.

There is one additional sequencing detail that requires attention. Any messages from all PADs in range will be received by the MFG and will be buffered in flash memory storage in the Logic Module 5 in the Display, for up to a month. If the CM is cutting, information from the PADs, in summary form, will be transmitted to the external monitor through the 345 kHz. However, if the CM was not cutting, the conveyor was not on, and the pump is on, the MFGs would be generating the 73 kHz marker field and would not be transmitting the information out through the 345 kHz, unless there was a Panic Call. In this case, there would be two transmitters transmitting on 345 kHz. However, as mentioned earlier, the CM transmitting at 345 kHz would only do so on a 50% duty cycle. The second CM would be considered the CM with the GO command, and would be the lead machine and would only turn on its transmission during the half second dead time of the other CM. Useful voice communications would not be possibly on the one CM until the other CM had relinquished control back to the first CM. This limitation does not negate the valuable benefits from the many useful safety features produced by the TramGuard™ system as described in previous paragraphs.

The above description and drawings are only illustrative of preferred embodiments of the present inventions, and are not intended to limit the present inventions thereto. Any subject matter or modification thereof which comes within the spirit and scope of the following claims is to be considered part of the present inventions.

What is claimed as new and desired to be protected by Letters Patent of the United States is:

The invention claimed is:

1. A marker field generator, comprising:
   an explosion-proof housing for the field generator;
   an inductor generating a marker field, said inductor comprising a ferrite rod wound with an electrical conductor.
2. The marker field generator according to claim 1, wherein the generator includes a set of capacitors having an amount of reactance approximately equal to an amount of reactance of the inductor.
3. The marker field generator according to claim 2, wherein a resonant frequency is less than 100 kHz.
4. The marker field generator according to claim 2, wherein the resonant frequency is 73 kHz.
5. The marker field generator according to claim 1, wherein the housing includes a non-metallic portion so that there is no metallic path around a circumference of the inductor.
6. The marker field generator according to claim 5 in which the housing includes a cylindrical section that is metallic and a section which houses the inductor that is non-metallic.
7. The marker field generator according to claim 6 in which said cylindrical section and said section which housed the inductor are connected by threads.
8. The marker field generator according to claim 2, further comprising an amplifier in a metallic housing that amplifies an alternating signal to provide alternating electrical current through a ferrite winding.
9. The marker field generator according to claim 1, wherein the explosion proof housing is protected from mechanical damage by a shield.
10. The marker field generator according to claim 9, wherein the shield is a metallic channel having a non-metallic cover over an open side of the channel so that metal does not surround the inductor.
11. The marker field generator according to claim 9, wherein the shield is a single molded piece with metallic supports embedded in side walls of the molded piece.
12. The marker field generator according to claim 9, wherein the shield is made from a metallic grid having a gap in a circumferential magnetic path around the inductor.
13. The marker field generator according to claim 12, further comprising a gap between the metallic grid and a remainder of the metallic structure.
14. The marker field generator according to claim 13, wherein the gap is filled with a silicone rubber pad.
15. The marker field generator according to claim 6, wherein an RF receiver is located in the non-metallic section to receive RF signals from a transmitter in a field sensing device that is used by a worker.
16. The marker field generator according to claim 15, wherein the RF transmitter also transmits commands and other information.
17. The marker field generator according to claim 15, wherein a micro-controller in the generator housing accepts information from the RF receiver, temporarily stores it, and then transmits it through a cable to a point where it can be acted upon.
18. The marker field generator according to claim 2 in which a power supply is included in the explosion-proof housing to power an amplifier and other electronics.
19. A marker field sensing device, comprising:
   a means to sense an oscillating marker field in the low frequency range, below 100 kHz;
   a micro-controller capable of acquiring information from circuitry in a field sensing device;
   an RF transmitter that transmits information regarding a sensed field to an RF receiver on a mobile machine; and
   a detachable battery power supply.
20. The marker field sensing device of claim 19, wherein the device is programmed with identification information to which all transmitted information is correlated.
21. The marker field sensing device of claim 20, wherein said device is adapted to transmit commands from a person using the device to a RF receiver on mobile equipment.
22. The marker field sensing device of claim 20, wherein the device is capable of transmitting status information about the device.

23. The marker field sensing device of claim 21, wherein a field sensing device has a minimum of two switches that are used by a worker to send commands to the RF receiver on the mobile machine.

24. The marker field sensing device of claim 23, wherein simultaneous activation of the two switches can be sent in the same transmission so that the simultaneous activation can be detected by the mobile machine for purpose of making a Panic Call.

25. A proximity-based portable system, comprising:
a marker field generator in an explosion-proof housing, the generator having a resonant circuit with an inductive reactance being provided by a ferrite rod wound with an electrical conductor;
an RF receiver included inside the housing to receive information about strength of a generated marker field from a sensing device used by a worker.

26. The proximity-based portable system of claim 25, further comprising a micro-controller in the explosion-proof housing that accepts information from the RF receiver.

27. The proximity-based portable system of claim 26, wherein the micro-controller processes information from the RF receiver to identify safety alarm devices within a receiver range and stores information received from safety alarm devices.

28. The proximity-based portable system of claim 25, wherein an adjustable squelch circuit limits incoming signals so as to reject unwanted low-level signals and noise and to limit a range of the RF receiver.

29. The proximity-based portable system of claim 25, further comprising a battery power supply.

30. The proximity-based portable system of claim 29, wherein a cable passes through a gland in the explosion-proof housing and is connected to the battery power supply.

31. The proximity-based portable system of claim 29, wherein a micro-controller turns off power from all elements except its own power in order to extend life of the battery power supply.

32. The proximity-based portable system of claim 31, wherein the micro-controller turns on the RF receiver on a pre-programmed schedule to determine if there is a worker wearing a safety alarm device within its range.

33. The proximity-based portable system of claim 32, wherein the micro-controller will activate the marker field generator if a worker using a safety alarm device is within range of the RF receiver.

34. The proximity-based portable system of claim 33, wherein information from signals from one or more safety alarm devices is received and stored.

35. The proximity-based portable system of claim 34, wherein the micro-controller powers down electronics once a safety alarm device is no longer in range.

36. The proximity-based portable system of claim 25, wherein the RF receiver operates at UHF frequencies.

37. A marker field generator, comprising:
an explosion-proof housing for housing said marker field generator;
an inductor producing the marker field, wherein at least a portion of the housing is non-metallic to prevent metal from circumferentially surrounding the inductor.

38. The marker field generator of claim 37, wherein the generator produces a marker field in a low frequency range that is below 100 kHz, but also radiates an electromagnetic field in a medium frequency range that is more than 100 kHz but less than 500 kHz.

39. The marker field generator of claim 38, wherein two selected frequencies are made resonant by switching one set of capacitors into a circuit to resonate at one frequency and a second set of capacitors to resonate at another frequency.

40. The marker field generator of claim 39, wherein sets of capacitors are arranged so that those used at the medium frequency are connected into a tap on the inductor winding.

41. A proximity-based safety system, comprising:
an alpha-numeric display assembly in an explosion-proof housing mounted on a continuous mining machine;
at least one generator attached to the continuous mining machine for producing a magnetic marker field around at least a portion of the machine; and
one or more personal alarm devices, each used by a worker, so that each device can sense and measure strength of a magnetic marker field, the one or more personal alarm devices each having an audible alarm and a means to transmit information to the alpha-numeric display on the mining machine, the display having a means to provide visual alarms and to provide signals that can be acted upon to stop the machine from moving.

42. A proximity-based safety system of claim 41, wherein the magnetic marker field is produced by one or more inductors, each inductor comprising a ferrite rod wound with an electrical conductor and protected within the explosion-proof housing.

43. A proximity-based safety system of claim 42, wherein three inductors operate in phase to collectively generate the magnetic marker field, each inductor being contained in the explosion-proof housing.

44. A proximity-based safety system of claim 42, wherein five inductors operate in phase to collectively generate the magnetic marker field, each inductor being contained in an explosion-proof housing.

45. A proximity-based safety system of claim 41, wherein the display is configured and sized to allow viewing at a distance of at least 10 feet behind the continuous mining machine.

46. A proximity-based safety system of claim 41, wherein the one or more of the personal alarm devices transmits warning information to the continuous miner through an RF transmitter.

47. A proximity-based safety system of claim 41, further comprising an RF receiver inside the explosion-proof housing containing the marker field generator, tuned to the same frequency as the RF transmitter in the one or more of the personal alarm devices, to receive information sent from the one or more personal alarm devices within range of the RF receiver.

48. A proximity-based safety system of claim 47, wherein up to ten personal alarm devices are within range of the RF receiver.

49. A proximity-based safety system of claim 48, wherein the one or more personal alarm devices can be programmed to issue a warning when the marker field is sensed and measured to have a field strength greater than a first selected value.

50. A proximity-based safety system of claim 48, wherein the one or more personal alarm devices can be programmed to issue a stop command when the marker field is sensed and measured to have a field strength greater than a second selected value.

51. A proximity-based safety system of claim 48, wherein relays are controlled from the display to interrupt control signals to tram motors and to boom hydraulic solenoids so as to prevent their movement.

52. A proximity-based safety system of claim 46, wherein the RF transmitter is operating in UHF frequency range.

53. A proximity-based safety system of claim 46, wherein motion of the mining machine can be stopped by a worker by activating a switch on one of said one or more personal alarm devices.

54. A proximity-based safety system of claim 53, wherein the motion of the mining machine can be stopped by the worker simultaneously by activating two switches on one of said one or more personal alarm devices.

55. A proximity-based safety system of claim 41, wherein the display assembly on the machine also indicates machine status and events during operation of the system.

56. A proximity-based safety system of claim 47, wherein the RF receiver receives commands from a remote control unit located in a separate explosion-proof housing.

57. A system comprising:
an alpha-numeric display assembly in an explosion-proof housing on a mining machine, said display assembly being capable to accept instructions from a remote control unit used by a worker who is not in physical contact with the display assembly; and
a remote-control unit that is capable of transmitting instructions to a portion of the system on the mining machine, the remote-control unit having at least two switches for issuing instructions to the portion of the system on the mining machine.

58. The system of claim 57, wherein the display assembly is configured and sized to allow use of the display assembly in controlling of the mining machine from a distance of at least 10 feet from the machine.

59. The system of claim 57, wherein the remote control unit issues instructions through an RF link which is received by the portion of the system on the mining machine.

60. The system of claim 58, wherein motion of the mining machine can be stopped by the worker issuing a Panic Call from a remote control unit.

61. The system of claim 59, wherein the display assembly on the machine shows a current menu option that is selected by the worker.

62. The system of claim 58, wherein the remote control unit has a third switch for changing values of parameters for selected items as shown by the display assembly.

63. The system of claim 58, wherein the display assembly on the machine also indicates machine status and events during operation of the system.

64. The system of claim 57, wherein an RF receiver which receives commands from the remote control unit is located in an explosion-proof housing other than the one in which the display is housed.

65. The system of claim 64, wherein the explosion-proof housing containing the RF receiver also contains a magnetic marker field generator.

66. A proximity safety system, comprising:
at least one marker field generator on a mining machine including a wire-wound ferrite inductor that generates the marker field;
at least one personal alert device, carried by personnel to be kept at a safe distance from the mining machine, the personal alert device being capable of detecting the marker field; and
an alpha-numeric display assembly on the mining machine that communicates information to the personnel about safety status.

67. The proximity safety system of claim 66, further comprising a means to record safety events and status for later review.

68. The proximity safety system of claim 67, further comprising a means to transmit safety and operational information by a medium frequency transmitter to a monitor.

69. A safety interlock system, comprising:
at least two continuous mining machines working in the same area having an interlock adapted to prevent the at least two machines from cutting mineral simultaneously; and
a communications element in the interlock having a medium-frequency RF signal transmitted between the at least two machines and being received by the at least two machines.

70. The safety interlock system of claim 69, wherein transmission of the medium frequency RF from each of said at least two continuous miners is accomplished by a ferrite wound with an electrical conductor protected inside an explosion-proof housing.

71. The safety interlock system of claim 70, wherein receivers of the medium frequency RF are each inside an explosion-proof housing, and a loop antenna is not in the explosion-proof housing.

72. A geosteering system that stops the cutting of a continuous miner when the cutter reaches an interface between a mineral being mined and an adjacent formation that is not to be mined, comprising:
a proximity safety system that prevents an operator from being near the continuous miner, the proximity system having a generated magnetic marker field and an operator using a personal alarm device that detects and responds to the marker field; and
a means to provide an alarm to the operator when the continuous miner is too close to the operator.

73. The geosteering system of claim 72, wherein the alarm is a visual alarm on the continuous miner.

74. The geosteering system of claim 73, wherein the visual alarm is produced on an alpha-numeric display.

75. The geosteering system of claim 72, wherein the alarm includes an audible alarm produced by the personal alarm device used by the operator.

76. The geosteering system of claim 72, wherein the continuous miner tram motors and boom hydraulics are disabled if the continuous miner is closer to the operator than a previously set limit.

77. The geosteering system of claim 76, wherein the alpha-numeric display displays information about a cutting process when there is no warning or stop condition.

78. The geosteering system of claim 76, wherein the display provides visual feedback to the operator as he chooses menu items from his personal alarm device and/or selects menu items.

* * * * *